(12) United States Patent
Zhang et al.

(10) Patent No.: US 11,483,810 B2
(45) Date of Patent: Oct. 25, 2022

(54) METHODS AND SYSTEMS FOR RESOURCE CONFIGURATION OF WIRELESS COMMUNICATION SYSTEMS

(71) Applicant: Huawei Technologies Co., Ltd., Shenzhen (CN)

(72) Inventors: Liqing Zhang, Ottawa (CA); Yu Cao, Ottawa (CA); Yongxia Lyu, Beijing (CN); Jianglei Ma, Ottawa (CA); Yi Wang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,441

(22) Filed: Nov. 17, 2017

(65) Prior Publication Data

US 2018/0288746 A1 Oct. 4, 2018

Related U.S. Application Data

(60) Provisional application No. 62/507,679, filed on May 17, 2017, provisional application No. 62/488,529, (Continued)

(51) Int. Cl.
*H04W 72/04* (2009.01)
*H04L 12/18* (2006.01)
(Continued)

(52) U.S. Cl.
CPC ......... *H04W 72/042* (2013.01); *H04L 1/0031* (2013.01); *H04L 5/0048* (2013.01);
(Continued)

(58) Field of Classification Search
CPC ... H04L 12/189; H04L 1/0009; H04L 5/0048; H04W 72/042; H04W 76/27; H04W 88/02
(Continued)

(56) References Cited

U.S. PATENT DOCUMENTS

2012/0213196 A1\* 8/2012 Chung .................. H04W 74/08
370/330
2014/0226581 A1 8/2014 Nam et al.
(Continued)

FOREIGN PATENT DOCUMENTS

CN 103369535 A 10/2013
CN 103875187 A 6/2014
(Continued)

OTHER PUBLICATIONS

Huawei et al., "Resource allocation and indication for data channel", 3GPP TSG RAN WG1 Meeting #88bis, R1-1705069, Apr. 3-7, 2017, 8 Pages, Spokane, USA.
(Continued)

*Primary Examiner* — Kibrom T Hailu
*Assistant Examiner* — Nizam U Ahmed
(74) *Attorney, Agent, or Firm* — Slater Matsil, LLP

(57) ABSTRACT

A method and apparatus to configure grant-free transmission resources are provided. At least two configuration options can co-exist for configuring the grant-free transmission resources. The base station may explicitly or implicitly notify a user equipment which option is selected for grant-free transmission by that user equipment.

27 Claims, 6 Drawing Sheets

Related U.S. Application Data filed on Apr. 21, 2017, provisional application No. 62/481,112, filed on Apr. 3, 2017.

(51) Int. Cl.

| | | |
|---|---|---|
| *H04L 5/00* | (2006.01) | |
| *H04W 76/27* | (2018.01) | |
| *H04W 74/00* | (2009.01) | |
| *H04L 1/00* | (2006.01) | |
| *H04W 88/02* | (2009.01) | |
| *H04L 1/18* | (2006.01) | |

(52) U.S. Cl.
CPC ......... *H04L 12/189* (2013.01); *H04W 74/006* (2013.01); *H04W 76/27* (2018.02); *H04L 1/0003* (2013.01); *H04L 1/0009* (2013.01); *H04L 1/1822* (2013.01); *H04L 5/0091* (2013.01); *H04L 2001/0093* (2013.01); *H04W 88/02* (2013.01)

(58) Field of Classification Search
USPC ........................................................ 370/312
See application file for complete search history.

(56) References Cited

U.S. PATENT DOCUMENTS

| | | | |
|---|---|---|---|
| 2015/0110038 A1* | 4/2015 | Yang | H04W 72/042 370/329 |
| 2015/0208387 A1 | 7/2015 | Awad et al. | |
| 2015/0264677 A1 | 9/2015 | He et al. | |
| 2016/0366704 A1 | 12/2016 | Lee et al. | |
| 2017/0019882 A1* | 1/2017 | Nimbalker | H04W 72/042 |
| 2017/0238321 A1 | 8/2017 | Sartori et al. | |
| 2017/0367110 A1* | 12/2017 | Li | H04W 74/0816 |
| 2017/0367120 A1 | 12/2017 | Murray et al. | |
| 2018/0035459 A1* | 2/2018 | Islam | H04W 74/04 |
| 2018/0049224 A1 | 2/2018 | Dinan et al. | |
| 2018/0109994 A1* | 4/2018 | Lee | H04W 48/12 |
| 2018/0124749 A1 | 5/2018 | Park et al. | |
| 2018/0183551 A1 | 6/2018 | Chou et al. | |
| 2018/0206246 A1 | 7/2018 | Zhang et al. | |
| 2018/0227936 A1* | 8/2018 | Yerramalli | H04L 1/1822 |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0270713 A1 | 9/2018 | Park et al. | |
| 2018/0270791 A1 | 9/2018 | Park et al. | |
| 2018/0270792 A1 | 9/2018 | Park et al. | |
| 2018/0270894 A1 | 9/2018 | Park et al. | |
| 2018/0270895 A1 | 9/2018 | Park et al. | |
| 2018/0279229 A1 | 9/2018 | Dinan et al. | |
| 2018/0279327 A1* | 9/2018 | Ying | H04L 5/0044 |
| 2018/0279339 A1 | 9/2018 | Löhr et al. | |
| 2018/0279348 A1 | 9/2018 | Huang et al. | |
| 2019/0159241 A1* | 5/2019 | Aiba | H04W 72/1284 |
| 2019/0174571 A1 | 6/2019 | Deenoo et al. | |
| 2019/0182884 A1 | 6/2019 | Deenoo et al. | |
| 2019/0215867 A1 | 7/2019 | Cheng et al. | |
| 2019/0239196 A1 | 8/2019 | Lee et al. | |
| 2019/0319686 A1 | 10/2019 | Chen, IV et al. | |
| 2019/0357159 A1 | 11/2019 | Pan et al. | |
| 2020/0008227 A1 | 1/2020 | Lee et al. | |
| 2020/0022160 A1 | 1/2020 | Zou et al. | |
| 2020/0028640 A1 | 1/2020 | Yeo et al. | |
| 2020/0045722 A1* | 2/2020 | Bae | H04L 5/0053 |
| 2020/0059867 A1 | 2/2020 | Haghighat et al. | |
| 2020/0153672 A1 | 5/2020 | Choi et al. | |
| 2020/0288482 A1 | 9/2020 | Yi et al. | |

FOREIGN PATENT DOCUMENTS

| | | |
|---|---|---|
| CN | 104380820 A | 2/2015 |
| CN | 104869653 A | 8/2015 |
| CN | 105451341 A | 3/2016 |
| CN | 105636211 A | 6/2016 |
| CN | 106507486 A | 3/2017 |
| EP | 3110195 A1 | 12/2016 |
| WO | 2016163709 A1 | 10/2016 |
| WO | 2017048324 A1 | 3/2017 |

OTHER PUBLICATIONS

Intel Corporation, "Uplink URLLC Transmission without Grant", 3GPP TSG RAN WG1 NR Ad-Hoc Meeting, R1-1700375, Jan. 16-20, 2017, 9 Pages, Spokane, USA.

Samsung, "UE reporting and dynamic SL SPS transmission", 3GPP TSG RAN WG2 Meeting #94, R2-163451, Apr. 23-25, 2016, 3 Pages, Nanjing, China.

ZTE, et al., "Basic Grant-free Transmission for URLLC", 3GPP TSG RAN WG1 Meeting #88, R1-1701594, Feb. 13-17, 2017, 8 Pages, Athens Greece.

Huawei, HiSilicon, "UL data transmission procedure with and without UL grant", 3GPP TSG RAN WG1 Meeting #90bis R1-1717091, Oct. 9-13, 2017, 18 pages.

Huawei, HiSilicon, "Configuration on Type 1 Grant-Free for Active UE", 3GPP TSG-RAN WG2 Meeting #99bis, R2-1711430, Oct. 9-13, 2017, 8 pages.

Huawei, HiSilicon, "UL Grant-free transmission," 3GPP TSG RAN WG1 Meeting #88, Athens, Greece, Feb. 13-17, 2017, R1-1701665, 15 pages.

Guangdong Oppo Mobile Telecom, "DL resource allocation and indication for NR", 3GPP TSG RAN WG1 meeting #88bis, R1-1704629, Apr. 3-7, 2017, 4 Pages, Spokane, Washington.

Huawei, et al., "Minimum UE bandwidth in NR", 3GPP TSG RAN WG1 Meeting #88bis, R1-1705059, Apr. 3-7, 2017, 4 Pages, Spokane, USA.

Huawei, et al., "Grant-free transmission for UL URLLC", 3GPP TSG RAN WG1 Meeting #88b, R1-1704222, Apr. 3-7, 2017, 7 Pages, Spokane, USA.

Vivo, "Discussion on NR resource allocation", 3GPP TSG RAN WG1 Meeting #88bis, R1-1704501, Apr. 3-7, 2017, 3 Pages, Spokane, USA.

\* cited by examiner

METHODS AND SYSTEMS FOR RESOURCE CONFIGURATION OF WIRELESS COMMUNICATION SYSTEMS

This application claims the benefits of U.S. Provisional Application No. 62/481,112, filed on Apr. 3, 2017, titled "Methods and Systems for Resource Configuration of Wireless Communication Systems," U.S. Provisional Application No. 62/488,529, filed on Apr. 21, 2017, titled "Methods and Systems for Resource Configuration of Wireless Communication Systems," and U.S. Provisional Application No. 62/507,679, filed on May 17, 2017, titled "Methods and Systems for Resource Configuration of Wireless Communication Systems," which applications are hereby incorporated by reference in their entireties.

TECHNICAL FIELD

The present disclosure relates to systems and methods for resource configuration of a wireless communication system.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, and when to send an uplink transmission using certain uplink resources. An example is a grant-free uplink transmission scheme in which UEs may send uplink transmissions using certain uplink resources shared by the UEs, without specifically requesting use of the resources and without being dynamically granted the resources by the base station. The base station will therefore not know which UE, if any, and when to send a grant-free uplink transmission using the preconfigured resources. Multiple terminologies can be used to mean the same thing as grant-free transmission, such as grant-less, grant-free random access, configured grant transmission, pre-configured grant transmission, (pre-)configured autonomous transmission, (UL) transmission without (dynamic) grant, and enhanced semi-persistent scheduling (SPS), etc.

SUMMARY

A method and apparatus for resource configuration for transmission without grant are provided.

In an embodiment, a first UE receives a first RRC signal from a base station. The first RRC signal specifies a first subset of configuration parameters for transmission without grant for the first UE. The first UE may also receive a first DCI signal from the base station. The first DCI signal may specify a second subset of the configuration parameters for transmission without grant for the first UE. The second UE receives a second RRC signal from the base station. The second RRC signal may specify one or more configuration parameters for transmission without grant.

In some embodiments, the first subset of the configuration parameters specified by the first RRC signal may comprise resource periodicity for transmission without grant. The second subset of the configuration parameters specified by the first DCI signal may include one or more of UL time/frequency resources reserved for transmission without grant, a modulation and coding scheme (MCS) parameter for transmission without grant, and a demodulation reference signal (DMRS) configuration for transmission without grant.

In some embodiments, the first UE may perform a first transmission without grant in accordance with configuration parameters for transmission without grant in the first RRC signal and the first DCI signal. Optionally, in one embodiment, the first UE may perform the first UL transmission without grant in accordance with the first subset of the configuration parameters for transmission without grant specified in the first RRC signal and the second subset of the configuration parameters for transmission without grant specified in the first DCI signal.

Optionally, in one embodiment, the one or more second UE configuration parameters specified by the second RRC signal may include one or more of uplink (UL) frequency resources reserved transmission without grant, starting time reference, resource periodicity, a time resource size parameter for, a modulation and coding scheme (MCS) parameter for transmission without grant, a demodulation reference signal (DMRS) configuration for transmission without grant, power control parameters, and one or more repetition factors for transmission without grant. In the second RRC signal, the time resource size parameter for transmission without grant may include an accessible start position and an accessible end position of a data transmission interval (TTI). The data TTI may be one of a symbol, a mini-slot, and a slot. The term "mini-slot" can also be referred to as "non-slot." The TTI here is also applicable to transmitting any control information in uplink (UL) and/or downlink (DL).

Optionally, in some embodiments, the one or more second UE configuration parameters specified by the second RRC signal may comprise transmission numerology for transmission without grant, sub-band division, and sub-band locations. In one embodiment, the transmission numerology for transmission without grant, the sub-band division, and the sub-band locations are pre-configured by explicit or implicit broadcasting signaling. In another embodiment, the transmission numerology for transmission without grant, the sub-band division, and the sub-band locations may be pre-configured by RRC signaling.

Optionally, in some embodiments, the one or more second UE configuration parameters of the second RRC signal may specify one or more bandwidth parts to be activated as one or more active bandwidth parts or to be defined as one or more default active bandwidth parts in a serving cell.

In some embodiments, the second UE performs a second UL transmission without grant in accordance with configuration parameters for transmission without grant specified by the second RRC signal. In one embodiment, DCI signaling is not required for resource configuration for the second UE. Thus, with the received second RRC, the second UE may perform the second UL transmission without grant without waiting for a DCI signal.

Optionally, in some embodiments, at least one of the first and second RRC signals may comprise information indicating one of at least two pre-defined resource configuration options for UL transmission without grant. The first pre-defined transmission resource configuration option may be a combination of dynamic Downlink Control Information (DCI) and non-DCI signaling based signaling (e.g., RRC signaling). The first RRC signal received by the first UE may indicate that the first UE is receiving a combination of RRC configuration and DCI/Layer 1 signaling configuration. The second pre-defined transmission resource configuration option may be the non-DCI signaling (e.g., RRC signaling) based configuration. The second RRC signal received by the second UE may indicate that the second UE is receiving a non-DCI signaling based configuration.

Optionally, in some embodiments, for the non-DCI signaling based configuration, a UE may receive configuration parameters updates in an RRC signal or a DCI signal from the base station. For example, the second UE may receive a third RRC signal comprising information for updating the one or more configuration parameters for transmission without grant specified by the second RRC signal. In another example, the second UE may receive a second DCI signal specifying information for updating the one or more configuration parameters for transmission without grant specified by the second RRC signal. After receiving the updates, the second UE may perform a UL transmission without grant in accordance with the updated one or more configuration parameters for transmission without grant.

Optionally, in one embodiment, a UE may use the configuration parameters for transmission without grant to perform data transmission without grant or control message transmission without grant. For example, the first UE may perform the first UL transmission without grant in accordance with the first and second subsets of configuration parameters for transmission without grant, and the first UL transmission without grant can be data transmission, control message transmission, or a combination of both. In another example, the first UE may perform the second UL transmission without grant in accordance with the one or more configuration parameters for transmission without grant specified by the second RRC signal, and the second UL transmission without grant can be data transmission, control message transmission, or a combination of both.

Optionally, in one embodiment, when in an inactive or an idle state, the first UE may receive a broadcast signal specifying one or more configuration parameters for transmission without grant from the base station. The one or more configuration parameters for transmission without grant may include at least one of UL frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The first UE may then perform a UL transmission in accordance with the one or more configuration parameters for transmission without grant specified by the broadcast signal.

Optionally, in another embodiment, when in an inactive or an idle state, the first UE may receive a multicast signal specifying one or more configuration parameters for transmission without grant from the base station. The one or more configuration parameters for transmission without grant may include at least one of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The first UE may then perform a UL transmission in accordance with the one or more configuration parameters for transmission without grant specified by the multicast signal.

Optionally, in one embodiment, when in an inactive or an idle state, the second UE may receive a broadcast signal specifying one or more configuration parameters for transmission without grant from the base station. The one or more configuration parameters for transmission without grant may include at least one of UL frequency resources reserved for transmission without grant, starting time reference, resource periodicity, time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The second UE may then perform a UL transmission in accordance with the one or more Configuration parameters for transmission without grant, wherein the one or more configuration parameters are specified by the broadcast signal.

Optionally, in another embodiment, when in an inactive or an idle state, the second UE may receive a multicast signal specifying one or more configuration parameters for transmission without grant from the base station. The one or more configuration parameters for transmission without grant may include at least one of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The second UE may then perform a UL transmission in accordance with the one or more configuration parameters for transmission without grant specified by the multicast signal.

In an embodiment, the base station transmits a first Radio Resource Control (RRC) signal to a first UE. The first RRC signal specifies a first subset of first UE configuration parameters. The base station may also transmit a first DCI signal to the first UE. The first DCI signal may specify a second subset of first UE configuration parameters. The base station transmits a second RRC signal to a second UE. The second RRC signal specifies one or more second UE configuration parameters.

In some embodiments, the first subset of the first UE configuration parameters for transmission without grant may comprise resource periodicity for transmission without grant. The second subset of the first UE configuration parameters for transmission without grant may comprise one or more of UL time/frequency resources reserved for transmission without grant, a modulation and coding scheme (MCS) parameter for transmission without grant, and a demodulation reference signal (DMRS) configuration for transmission without grant.

In some embodiments, the base station receives, from the first UE, a first UL transmission without grant in accordance with configuration parameters for transmission without grant in the first RRC signal and the first DCI signal. Optionally, in one embodiment, the base station may receive the first UL transmission without grant in accordance with the first subset of the configuration parameters for transmission without grant specified in the first RRC signal and the second subset of the configuration parameters for transmission without grant specified in the first DCI signal.

Optionally, in one embodiment, the second RRC signal may include one or more of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. In the second RRC signal, the time resource size parameter for transmission without grant may include an accessible start position and an accessible end position of a data transmission interval (TTI). The data TTI may be one of a symbol, a mini-slot, and a slot. The terminology "mini-slot" can also be referred to as "non-slot." The TTI here is also applicable to transmitting any control information in uplink (UL) and/or downlink (DL).

In some embodiments, the base station receives, from the second UE, a second UL transmission without grant in accordance with configuration parameters for transmission without grant in the second RRC signal. In one embodiment, DCI signaling is not required for resource configuration for the second UE. Thus, with the transmitted second RRC, the base station may receive, from the second UE, the second UL transmission without grant without waiting transmitting a DCI signal to the second UE.

Optionally, in some embodiments, at least one of the first and second RRC signals may comprise information indicating one of at least two pre-defined resource configuration options for UL transmission without grant. The first pre-defined transmission resource configuration option may be a combination of dynamic Downlink Control Information (DCI) and non-DCI signaling based signaling (e.g., RRC signaling). The first RRC signal transmitted by the base station may indicate that the first UE is receiving a combination of RRC configuration and DCI/Layer 1 signaling configuration. The second pre-defined resource configuration option may be the non-DCI signaling (e.g., RRC signaling) based configuration. The second RRC signal transmitted by the base station may indicate that the second UE is receiving a non-DCI signaling based configuration.

Optionally, in some embodiments, for the non-DCI signaling based configuration, a base station may transmit configuration parameters updates in an RRC signal or a DCI signal to a UE. For example, the base station may transmit to the second UE a third RRC signal comprising information for updating the one or more configuration parameters for transmission without grant specified by the second RRC signal. In another example, the base station may transmit, to the second UE, a second DCI signal specifying information for updating the one or more configuration parameters for transmission without grant specified by the second RRC signal. After transmitting the updates, the base station may receive a UL transmission without grant in accordance with the updated one or more configuration parameters for transmission without grant.

The present disclosure provides more technical features with technical improvements over conventional systems. In one system, the LTE SPS design is targeted for voice services, where the traffic is periodic and predictable. Embodiments of the present disclosure provide flexible techniques to support more applications and services such as Ultra Reliable Low-Latency Communication (URLLC), enhance Mobile Broad Band (eMBB), and massive Machine Type Communication (mMTC) with periodic and aperiodic traffic, and support small packets, low latency, and/or high reliability in a network system, where a UE can be configurable to use a different transmission option based on either the device capability and application requirements. As such, the described techniques improve the network system with more efficient utilization of the network resources.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
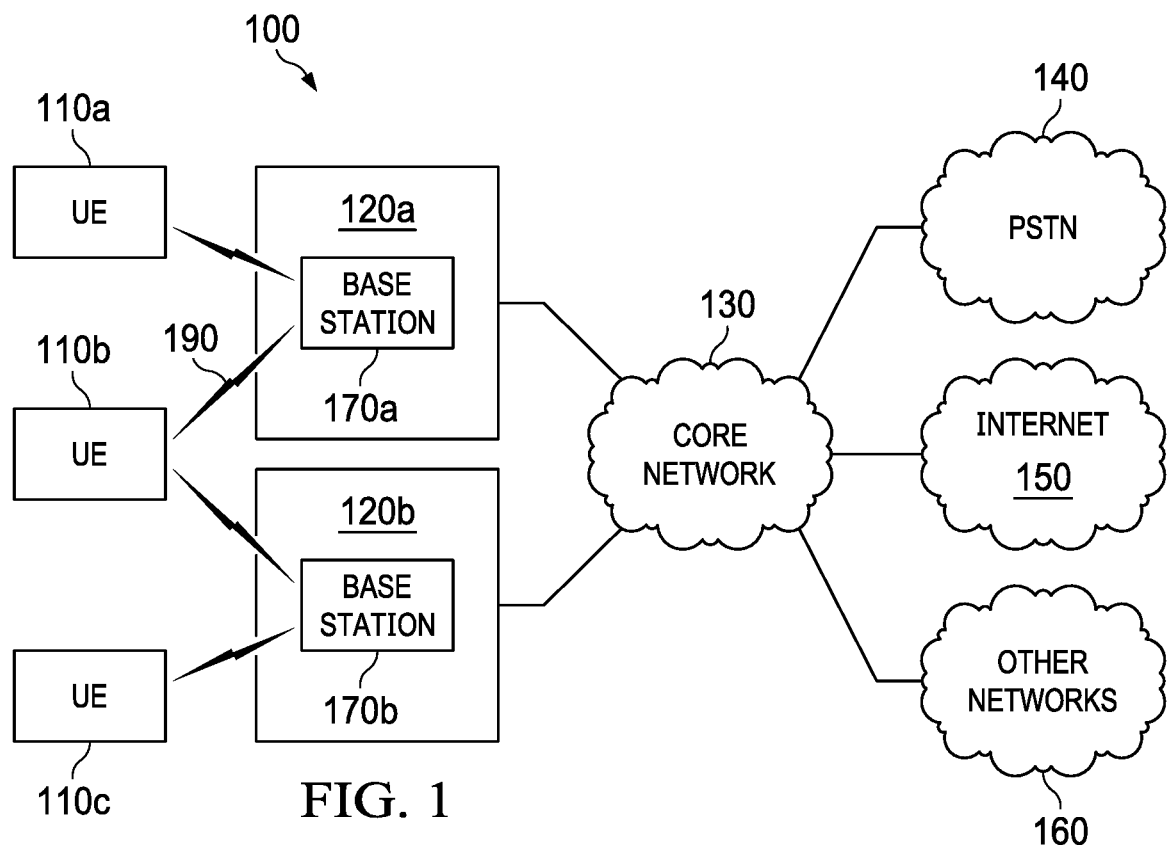
FIG. 1 is a block diagram of a communication system.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipments (UEs) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 1, any number of these components or elements may be included in the system 100.

The UEs 110*a*-110*c* are configured to operate and/or communicate in the system 100. For example, the UEs 110*a*-110*c* are configured to transmit and/or receive via wireless or wired communication channels. Each UE 110*a*-110*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, or a transmit-receive point (TRP). The UEs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the UEs 110a-110c may include functionality for communicating with different wireless networks over different wireless links using different wireless technologies and/or protocols. Instead of wireless communication (or in addition thereto), the UEs may communicate via wired communication channels to a service provider or switch (not shown), and to the internet 150.

Although FIG. 1 illustrates one example of a communication system, various changes may be made to FIG. 1. For example, the communication system 100 could include any number of UEs, base stations, networks, or other components in any suitable configuration.

Grant-free uplink transmissions are sometimes called "grant-less," "schedule free," or "schedule-less" transmissions, or transmissions without grant. Grant-free uplink transmissions from different UEs may be transmitted using the same designated resources, in which case the grant-free uplink transmissions are contention-based transmissions. Grant-free uplink transmissions may be suitable for transmitting bursty traffic with short packets from the UEs to the base station, and/or for transmitting data to the base station in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to these applications.

The uplink resources on which grant-free transmissions are sent will be referred to as "grant-free uplink resources." For example, the grant-free uplink resources may be a designated region in an OFDMA frame. The UEs may use the designated region to send their grant-free uplink transmissions, but the base station does not know which of the UEs, if any, are going to send a grant-free uplink transmission in the designated region.

The grant-free uplink resources may be predefined, e.g., known in advance to both the UEs and the base station. The grant-free uplink resources may be static (never change), or the grant-free uplink resources may be configured semi-statically. A semi-static configuration means that it is configured once and is only updated/changed slowly, such as once in many frames or may only be updated as needed. A semi-static change differs from a dynamic change in that a semi-static change does not occur as often as a dynamic change. For example, a dynamic change/update may refer to a change every subframe or every few subframes, and a semi-static change may refer to a change that only occurs once every several OFDM frames, occurs once every few seconds, or updates only if needed.

In some embodiments, the grant-free uplink resources may be preconfigured, e.g., there may be a plurality of possible predefined grant-free uplink resource partitions, and the base station or the network may semi-statically pick one of the predefined grant-free uplink resource partitions and signal to the UEs the grant-free uplink resource partition being used. In some embodiments, the base station and/or the UEs may be configured during their manufacture to know which uplink resources to use as grant-free uplink resources, e.g., through predefined tables loaded during manufacture. In some embodiments, the grant-free uplink resources may be semi-statically configured, e.g., by using a combination of broadcast signaling, higher layer signaling (RRC signaling) and dynamic signaling (e.g., DCI signaling or, equivalently, L1 signaling) by the base station. By dynamically signaling the grant-free uplink resources, the base station or network may adapt to the system traffic load of the UEs. For example, more grant-free uplink resources may be allocated when there are more UEs being served that may send grant-free uplink transmissions. In some embodiments, a control node (e.g., a computer) in the network may determine the grant-free uplink resources to be used. The network may then indicate the grant-free uplink resources to the base station and the UEs. In some embodiments, a UE operating in grant-free mode may be semi-statically configured to combine: 1) the RRC signaling information and the system information; or 2) the RRC signaling information and the DCI information; or 3) the RRC signaling information, the system information and the DCI information to determine an assigned transmission resource.

A message may be sent by UE in a grant-free uplink transmission over uplink channel. The message is transmitted using a multiple access (MA) resource. A MA resource includes a MA physical resource (e.g., a time-frequency block) and at least one MA signature. The MA signature may include (but is not limited to) at least one of the following:

a codebook/codeword, a sequence, an interleaver and/or mapping pattern, a pilot, a demodulation reference signal (e.g., a reference signal for channel estimation), a preamble, a spatial-dimension, or a power-dimension. The term "pilot" refers to a signal that at least includes a reference signal, e.g., a demodulation reference signal. The reference signal may be the MA signature. In some embodiments, the pilot may include the demodulation reference signal, possibly along with a channel-estimation-oriented preamble, or a random access channel (LTE-like RACH) preamble.

In some embodiments, the uplink transmissions may use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Depending upon the multiple access method used, the MA signature may take different forms. The MA signature may relate to the specific format used for the multiple access method. For example, if SCMA is used, then the MA signature for the uplink transmission may be the SCMA codebook used for the uplink transmission. As another example, if IGMA is used, then the MA signature for the uplink transmission may be the IGMA's signature, interleaving pattern or grid mapping used for the uplink transmission.

To make grant-free (GF) uplink transmissions, a UE should have full UL GF transmission resource information. Generally, some of GF information may be obtained from broadcast system information from a base station. For other GF resource information, there are several options to allocate to a UE.

In 5G, it is possible that all three application types will use GF transmission: Ultra Reliable Low-Latency Communication (URLLC), enhance Mobile Broad Band (eMBB), and massive Machine Type Communication (mMTC).

Figure 2:
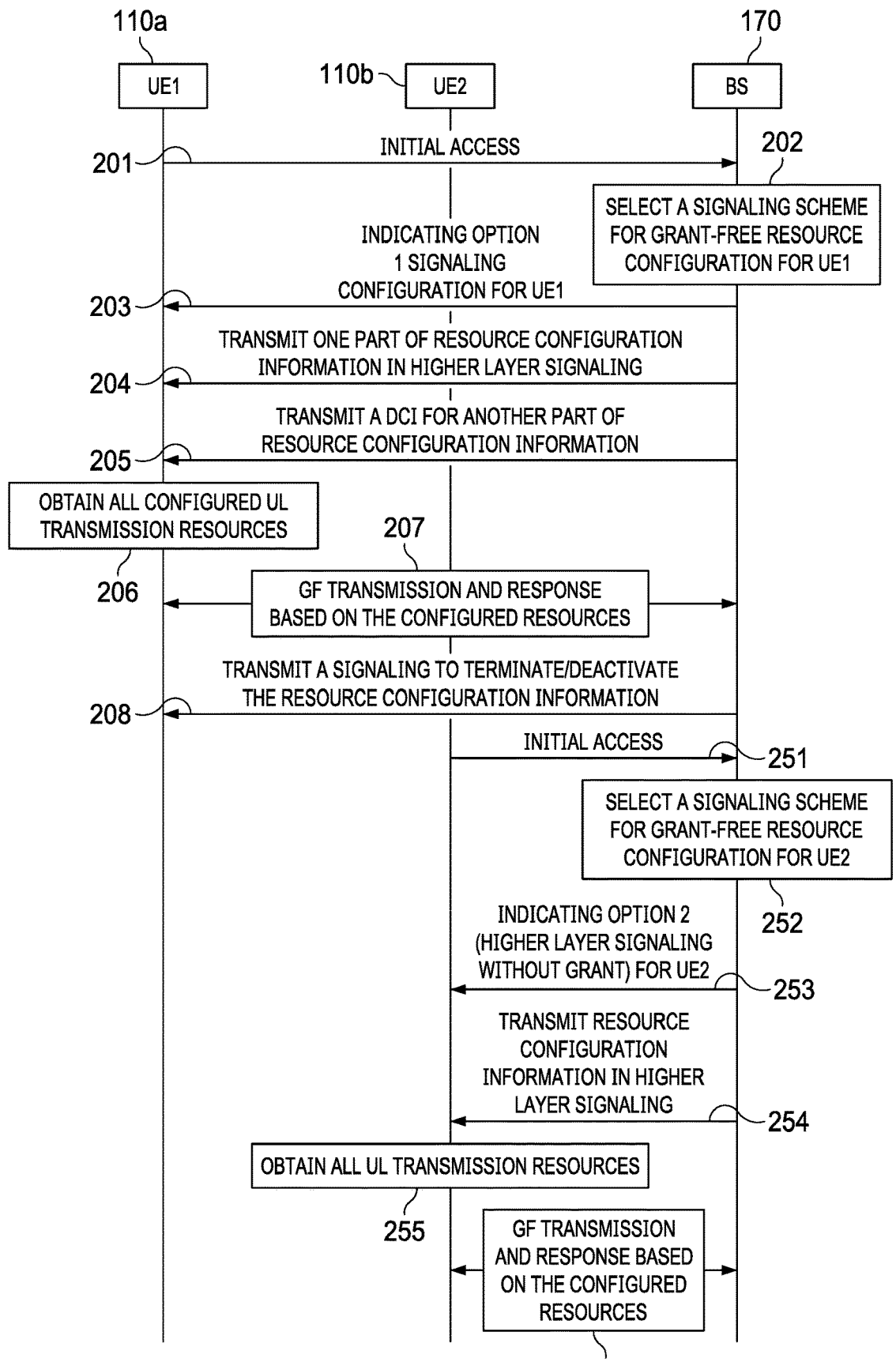
FIG. 2 is a flowchart of a method for configuring uplink GF transmission resources.

FIG. 2 illustrates two possible options to allocate GF transmission resources to a UE. As an example, UE1 110a takes option 1 using a combination of RRC and DCI signaling, and UE2 110b takes option 2 using RRC signaling only. It should be noted that the option a UE takes can be a default one or determined when the UE accesses the network, or can be taken directly from broadcast system information, or can be determined from any UE-specific signaling. The option selection can vary from option 1 to option 2 or vice versa depending on system load, channel conditions, traffic type (e.g., periodic or aperiodic), application type (URLLC, eMBB, mMTC), packet size, etc. The selected option can be semi-static or dynamically adjusted. In accordance with the present disclosure, option 1 and option 2, or more GF signaling options, can co-exist to provide resource configuration for grant-free transmissions. Furthermore, some channels can be shared by grant-free and grant-based transmissions of a same user or different users, for example, some ACK/NACK feedback channel such as a UE specific PDCCH or a group common PDCCH channel. Thus, one signaling message can include both grant-free and grant-based configuration information.

At step 201, UE1 is performing an initial access to the system.

At step 202, the base station (BS 170) selects a GF resource configuration option for UE1. In this example, option 1 is selected for UE1.

At step 203, the BS notifies UE1 that a combination of RRC configuration and DCI/Layer 1 signaling configuration (option 1) is selected for UE1. UE1 can get this notification just after its initial access, or from broadcast information by the BS, or pre-defined, or from any UE-specific signaling such as downlink control information (DCI) or radio resource control (RRC) signaling or any kind of non-DCI signaling, or any multicast signaling. Hence option 1 generally is a signaling scheme on a combination of non-DCI signaling and DCI signaling allocation. As used herein, non-DCI signaling can be RRC, broadcast, or multicast, a combination of any two of them, or a combination of the three.

At step 204, with option 1, one part of the resource configuration information is transmitted from BS to UE1 via non-DCI signaling (such as broadcast, multi-cast, or RRC), e.g., periodicity information. In other embodiments, periodicity can be set to 1, meaning that any resource to be allocated by DCI signaling and the resource can be used by the UE in any time slot, i.e., the frequency domain resource without time limitation for usage; meanwhile the user does not transmit anything if the UE has no data in its buffer, and repetitions and retransmissions of the user can use same or different resources configured/allocated by DCI signaling.

At step 205, with option 1, another part of resource configuration information is transmitted from BS to UE1 via DCI (Physical Downlink Control Channel, shorted as PDCCH) or group common PDCCH signaling. The DCI signaling may include at least any one of, but not limited to, following information: GF resource size in frequency domain, resource hopping pattern, explicit or implicit signaling of actual time/frequency/RS resources or resource indices, modulation and coding scheme (MCS) which can be UE specific (e.g., fixed value) or resource specific (e.g., a MCS hopping pattern on different resources), number of repetition K which is UE specific and may be combined with TTI bundling size. One or more MCS schemes and/or one or more K values can be configured to one user. UE resource can be updated or changed, or deactivated any time by the DCI-type dynamic signaling configuration, while the UE can acknowledge or may not acknowledge the dynamic signaling configuration.

At step 206, UE1 collects all configured UL GF transmission resources from steps 204 and 205, and possibly broadcast signaling if any.

At step 207, UE1 and the BS make GF transmissions and corresponding responses based on the configured resources and traffic arrivals.

At step 208, the BS may terminate or deactivate the configuration information by non-DCI signaling or DCI signaling. If a UE receive a DCI termination or deactivation signal, it may assume that the information obtained from the DCI configuration is discarded and the UE needs to wait for another DCI configuration before any GF transmission or wait for the signaling of another option or fallback to default option, where DCI resource termination or deactivation can be based multiple factors, such as UE silent for a configurable time period without transmitting any data.

UE2 takes similar steps but it takes option 2 signaling scheme, where the GF resource configuration will be accomplished by the non-DCI signaling only.

At step 251, UE2 makes an initial access to the system.

At step 252, the BS selects a GF resource configuration option for UE2. In this example, option 2 is selected for UE2.

At step 253: the BS notifies UE2 that non-DCI signaling configuration (option 2) is selected for UE2. UE2 can get this notification just after its initial access, or from broadcast information by the BS, or pre-defined, or from any UE-specific signaling such as downlink control information (DCI) or radio resource control (RRC) signaling or any kind of non-DCI signaling, or any multicast signaling. Option 2 includes only the non-DCI signaling and does not require DCI signaling for resource configuration.

At step 254, with option 2, resource configuration information is transmitted from the BS to UE2 via non-DCI signaling (such as broadcast, multi-cast, or RRC), e.g., contention transmission unit (CTU) defined as a combination of at least some of time/frequency and RS resources, one or more hopping patterns based on the resource index on time domain and/or frequency domain and/or even reference signal(s), one or more MCSs, one or more repetition factors K, etc. In another embodiment, the GF resource configuration can be per user or per cell based; one or more RS s, MCSs and or Ks can be per GF resource based. The configuration of resources and parameters can be updated semi-statically by non-DCI signaling and/or dynamically by DCI signaling, where if both signaling schemes are applied, a rule or protocol should be determined in terms of, e.g., what's changing and application scope such as applicable time period (one TTI or forever) and for the current transmission block or not, etc.

At step 255, UE2 collects all configured UL GF transmission resources from 254 and possibly broadcast signaling if any.

At step 256, UE2 and BS make GF transmissions and corresponding responses based on the configured resources and traffic arrivals.

UE1 with option 1 has to monitor DCI, and UE1 cannot make GF transmission without the information included in DCI configuration. UE2 with option 2 does not need to monitor DCI, and UE2 can perform GF transmission right after reception of non-DCI signaling based GF resource configuration. In some other scenarios, UE2 may still monitor DCI for control signaling although can perform GF transmission without the DCI configuration/activation.

With option 2, it is not necessary to have the step to terminate or deactivate the resource. Option 2 is more suitable for aperiodic UL traffic, while option 1 is more suitable for periodic traffic. But there is no strict limitation either way. It is still possible for an aperiodic transmission with option 1, or a periodic transmission with option 2. When a UE has both aperiodic and periodic traffic, it is also possible that that UE takes both options. In some embodiments, with option 2, the GF resource can still be terminated/deactivate semi-statically (e.g., through RRC) or dynamically (e.g., through DCI).

In a system, it is possible that different users may have different options to obtain the resource configuration; or a same user can have one signaling scheme and then switch to another signaling scheme based on factors such as system traffic type and loading, and the user applications scenarios and requirements, etc. Also, a GF user can also be configured the same time as grant-based transmissions, where the configuration signaling used for grant-based transmission can be same as or different from the GF signaling scheme.

For both options, the configuration options can be cell specific or UE specific or group specific. It is also possible that this option signaling can be implicit by mapping the option information from any other information, which may be, but not limited to, be any of the following: pre-defined based on the device type, UE ID, or the periodicity information. For example, if a RRC signaling indicates just the periodicity information, one UE knows it is option 1 because it needs to wait for a DCI for further resource configuration and/or activation and to access the resource for transmission according to the periodicity. On the other hand, if a RRC signaling has already includes enough resource information required for grant-free transmission (which may or may not be combined with broadcast resource information), one UE knows it is option 2 and does not need to wait for a DCI. In that sense, there will be no step 203/253. Correspondingly, one UE may decide whether the signaling option is option 1 or 2 by checking whether RRC contains the enough resource configuration information required for GF transmission (may or may not be combined with broadcast resource information). For example, if the resource configuration does not include the frequency location or the size of each allocated resources (e.g., number of physical resource blocks (PRBs) or virtual resource blocks (VRBs)), it indicates the use of option 1, i.e., it requires complementary DCI signaling for resource configuration. If the resource configuration includes the frequency location or the size of each allocated resources (e.g., number of physical resource blocks (PRBs) or virtual resource blocks (VRBs), it indicates the use of option 2, i.e., it does not require complementary DCI signaling for resource configuration.

In one implementation, when there is a default option for GF UE, either option 1 or option 2, step 202/252 and subsequent steps are triggered with the change of system load, or channel conditions, traffic type (e.g., periodic or aperiodic), application type, packet size, etc. For the default option, the explicit indication is not needed either. In that case, if the selected option is same as default option in the step 202/252, there will be no step 203/253, which can also be regarded as an implicit signaling.

It is also possible for a UE to explicitly or implicitly (e.g., by application type or by traffic type) indicate its preference for which signaling options to use, e.g., in step 201/251 or other steps.

In both option 1 and option 2, some of the common information (non-UE specific) may be signaled in broadcast or multi-cast signaling instead of RRC or DCI. For example, the GF resource unit or contention transmission unit (CTU) definition may be common for all UEs, The information can then be specified in broadcast or multi-cast signaling in, e.g., system information block (SIB). The total resource region for GF transmission may also be signaled in broadcast or multi-cast signaling, e.g., in SIB.

In FIG. 2, two options have been described, but the described option notifying scheme still applies if more than two options are supported in the system.

Grant-Free and Grant-Based Resources

In a new radio (NR) wireless system, any user can be configured as grant-based and/or grant-free transmissions depending on, e.g., the application and/or device types and requirements. Usually, a grant-free transmission may require resource (pre-)configuration at the user connection setup and have resource reconfiguration or an update during the transmissions. In some embodiments, the grant-free resources can be configured for users by broadcast or multi-cast signaling in some scenarios, e.g., in inactive or idle mode. Two or more grant-free transmissions can share the same configured resources; and a grant-based transmission can use dedicated resources or can contend (fully or partially) with grant-free resources in a time interval.

Any of the grant-free and grant-based transmissions can be used for any application traffic or services types, depending on the associated application requirements and quality of services (QoSs). For example, a grant-free transmission can be used for a user with some URLLC traffic to satisfy the extreme low latency requirement; it can be used for a user with eMBB traffic short packets to save signaling overhead; a grant-based transmission can be used for a user with some URLLC traffic with the reasonable latency requirements; it can be used for a user with eMBB traffic to dynamically take advantage of link adaptation and enhance resource utilization and spectrum efficiency.

One user or a group of users may have a group ID or RNTI (e.g., GF-RNTI, GB-RNTI) to share the common or same parameter and/or resource configuration. The group ID can be pre-defined, broadcasted/multi-casted notified, pre-configured, or dynamically configured to each user; the parameter or resource configuration to the user(s) with the group ID can be done by broadcast, multicast, RRC signaling, and/or dynamic DCI based signaling (e.g., user specific DCI or group common PDCCH). In one embodiment, each UE with common resource/parameter configuration using a group ID can have its specific or unique parameter(s) such as DMRS to differentiate from other UEs, by a pre-defined, pre-configured, or pre-mapping way for the UE. In some embodiments, the group ID can be used for, e.g., resource deactivation and/or activation for the users in the group, wherein the resource includes frequency, time, reference signal (RS) associated with each user in the group.

Resources and Parameters to be Configured for a Grant-Free Transmission

To support grant-free transmissions, the associated resources configured for a user or a group of users include the following: 1) frequency resources and size in TTI (e.g., a symbol, mini-slot or slot): either virtual resource block (VRB) scheme which indicates virtual starting RB and size, and is associated with frequency hopping, assumed that the user or the group of users has received the sub-band division and carrier bandwidth info from the broadcast or multicast signaling; or, physical RB (PRB) scheme which indicates physical starting RB and size; 2) time resources and period, including accessible starting/ending position of one data transmission time interval (e.g., TTI can be one symbol, mini-slot or slot) and time interval resource periodicity (for example, 0 represents all the time period resources, 1 represents every other TTI resources, 2 represents every two TTIs resources, and so on) and starting time reference (for example, first symbol in a sub-frame); 3) RS or RSs configuration, where each user can be configured with one or more reference signals (RSs or DMRSs) depending on the scenarios, for example, initial transmission RS can be different from retransmission RS to identify user initial and retransmissions of a transmission block (TB) for potential HARQ signal combination and detection; in one embodiment, a user can be (pre-) configured or assigned one RS for initial transmissions while the user retransmission RS(s) can be derived from either a configured mapping rule or pre-defined mapping, or a set of RSs can be (pre-)configured or assigned explicitly for initial and retransmissions, respectively. Moreover, different reference signals can also identify different UL transmission ports and/or different UL beams, or a different UL RS can indicate which a different DL beam that is received with strong signal strength. For a group of users, each user may or may not have a different RS or have a different set of RSs. Note that different RSs can be orthogonal or non-orthogonal depending on scenarios such as different applications, e.g., URLLC or mMTC service; 4) UE/UE group specific hopping parameters, including two parameters. One is hopping pattern cycle period: either absolute reference duration (e.g., 20 TTI before repeating itself) wherein, based on accessible time interval resource periodicity (e.g., 2 TTI), the number of hopping (e.g., 10 times) to make before repeating the pattern again (e.g., 10) can be determined; or, absolute number of hopping times (e.g., hopping 20 times before repeating itself). The other is hopping pattern index or indices, where one user may have one or more hopping pattern indices; 5) one or more HARQ process IDs per user. A maximum number of retransmission times or a timer from the transmission start of a TB can be defined or configured to flush a HARQ buffer if the transmissions of the TB associated with the HARQ buffer are not successful for some period of time; 6) one or more MCSs per user, where a grant-free user can indicate explicitly or implicitly which MCS to use for a transmission, for example, using a different pilot to represent a different MCS among the configured MCSs for the user, or using a pre-configured GF resource associated with a pre-configured MCS known to both users and a base station, or using UL control channel to indicate which MCS in use before or at the same time with the data transmission; 7) the number of repetitions K, one or more K values can be configured for a user, where which K value to use depends on certain rule such as user channel conditions, service types, etc.; 8) at least two parameters to control a valid usage of the grant-free resources: one used as a flag, e.g., F1, if enabling activation/deactivation/release (e.g., 0, disable; 1, enable), one used as a flag, e.g., F2, to indicate activation/deactivation status (e.g., 0, deactivated; 1 activated); 9) one parameter for configuration, including an indication if enabling a grant-free user to awake up or not for the data transmission during Discontinuous Reception (DRX) OFF period upon a packet arrival; 10) power control parameters, including power ramping step size (e.g., for a beam); 11) one or more bandwidth part (BWP) configurations, each including numerology (e.g., subcarrier spacing and CP type/overhead), a bandwidth of one bandwidth part, a starting frequency location for the bandwidth part, etc. These parameters can be used for BWP configurations, active or default active BWPs activation and/or BWPs de-activation/to be switched from (and to be de-activated)/to (and to be activated); 12) waveform type, e.g., CP-OFDM or DFT-s-OFDM; 13) other parameters, including information associated with general grant-based data and control transmissions. Note that, sometimes, a subset of grant-free resources can be referred to as "fixed" or "reserved" resources; whereas a subset of grant-based resources can be referred to as "flexible" resources, which can be dynamically scheduled by a base station.

To support a grant-based transmission, a user access resource is usually dynamically scheduled in every time interval, except for the cases where a user resource can be dynamically scheduled once but used for more than one interval, such as DCI or Layer-1 (L1) activation in SPS or a transmission with bundling or repetitions. A grant-based resource is not necessarily needed to be pre-configured for a user before the grant-based transmission, which is different from a grant-free resource configuration.

In some embodiments, the grant-free resources can be configured for data transmissions, control message transmissions (dedicated for a user or shared by a group of users), or a combination of both control and data transmissions. For example, an enhanced scheduling request (SR) can be designed to use a grant-free resource to reduce the request latency, which may or may not be shared by multiple users. For a grant-free resource configured only for control messages such as SR, UE feedback, measurement reports (e.g., a beam measurement report, a CSI-RS based measurement report, a DM-RS based measurement report), the grant-free resource may or may not be shared by multiple users. In another embodiment, a grant-free resource can be configured for one or more users on UL sounding reference signal (SRS) or tracking signals, for example, a user can use the grant-free resource for sending aperiodic SRS signals. In other embodiments, a grant-based resource can be used by a UL control signal that may include a request for grant-free services, for example, a scheduling request (SR) in dedicated PUCCH channel can include an indication to the base station to request GF resource configuration, activation or re-configuration for grant-free type of traffic and grant-free transmissions. Moreover, the SR can also include information in the request message, for example, an indication of (new) MCS and numerology parameters to be used, packet size to be transmitted, power headroom left over, etc., for UL grant-free transmissions.

Grant-Free and Grant-Based Shared Signaling

Due to the grant-free transmission nature, the system design should consider some specific types of signaling for grant-free transmissions, for example, RRC configuration of grant-free resources for a user or a group of users, grant-free resource configuration in user inactive or idle mode, some specific mechanisms for control or management on the grant-free transmissions such as parameters to indicate if an activation, deactivation, and/or releasing of the grant-free resources of one or more users may be allowed.

In general, the grant-free and grant-based transmissions and users can share one or more common types of control signaling such as DCI, RRC, LTE-like RAR, and broadcasting, etc., for the resource and/or parameter configuration, including minimum system information for control and data transmissions, e.g., numerology and sub-band division parameter configuration from broadcasting (explicitly or implicitly) or RRC signaling, MCS update from DCI, etc. A shared signaling format can be same as LTE grant-based one or NR grant-based format; or a shared signaling format can be a command format modified from grant-based signaling format or a harmonized signaling format for grant-based and grant-free transmission configuration.

In some embodiments, one or more common types of control signaling can have a same format which works for both grant-free and grant-based transmissions. For example, a same signaling format for grant-based transmission control can be used for grant-free transmission control, for example, one or more information bits in the format with different values can indicate a transmission in terms of the grant-free or grant-based transmission type/user/resource, but the signaling format can provide the same control context on the transmission resources and/or parameter(s), for example, a resource allocation with RS, MCS, DRX configuration, and configuration of RRC inactive/idle mode, etc.

In other embodiments, one or more common types of control signaling can have a harmonized format by considering additional grant-free control requirements on top of a grant-based signaling format. For example, increasing the information bit length for one or more parameters/elements in a grant-based signaling format to indicate more options, including the grant-free signaling or control contexts; or adding more elements in a grant-based signaling format to include the specific control contexts for grant-free transmissions. It would be most efficient if the control contexts in a shared signaling are the same for both grant-based and grant-free transmissions; in other cases, as many as same control contexts (e.g., RS, MCS) in a shared and common signaling should be considered in the signaling design for both grant-based and grant-free transmissions.

These considerations on specific grant-free signaling and the shared signaling designs can make the co-existence of the grant-free and grant-based transmissions be an integral network and operate very effectively and efficiently.

Grant-Free Resource Configuration Option A: RRC Based Scheme

Before configuring the grant-free (GF) resources for a user or a group of users by RRC signaling, some associated grant-free information can be broadcasted or multi-casted from the base station to users such as grant-free transmission numerology, sub-band division, sub-band locations, optionally, group ID(s) for grant-free users, etc., where these grant information can be sent together with other common broadcast/multicast information for general grant-based transmissions.

During the user network entry with connection setup, RRC signaling configures for a grant-free user or a group of grant-free users (with a group ID) the GF resources and parameters described in a previous paragraph, including time/frequency/RS, hopping, HARQ process(es), MCS(s), and K(s), and following parameters.

The two parameters associated with the resource activation and deactivation to control a valid usage of the grant-free resources are configured: one used as a flag, e.g., F1, to indicate if enabling activation/deactivation/release (e.g., 0, disable; 1, enable) is allowed, which is a configurable feature that is able to apply L1 signaling for dynamic resource activation, deactivation and/releasing; one used as a flag, e.g., F2, to indicate activation/deactivation status (e.g., 0, deactivated; 1 activated). If F1 is set to disable, F2 can be set to any value (0 or 1), and UL transmission without grant can be performed by a UE without any L1 activation. If F1 is set to enable, F2 can be used to indicate resource activation true or not status, where F2 being activated value (1) means UL transmission without grant can be performed by a UE after the semi-static configuration (without any L1/DCI further activation), which at least can be used for configuration of URLLC applications and services, and F2 being de-activated value (0) means UL transmission without grant has to wait for further L1 activation signaling before starting any data transmission, which at least can be used for configuration of periodic traffic such as VoIP applications.

DRX parameters can be configured, where grant-free user behavior may or may not be the same as grant-based user. At least one more parameter specific for grant-free DRX behavior can be defined to indicate if a grant-free user is allowed to early wake up upon a packet arrival during DRX OFF period for data transmission.

After the semi-static resource configuration, RRC signaling performs semi-static re-configuration for a grant-free user or a group of grant-free users (with a group ID) on the GF resources and parameters described in a previous paragraph, including time/frequency/RS, hopping, HARQ process(es), MCS(s), and K(s), the two parameters associated with the resource activation and deactivation, and DRX parameters.

From user perspective, a grant-free user may or may not stop DRX inactivity timer and onDuration timer upon DRX command MAC CE reception from the base station, depending on if a grant-free user is configured and allowed to early wake up upon a packet arrival during DRX OFF period for data transmission.

In this option, by default, F1 is set to "disable"; or F1 is set to "enable" and F2 is set to "activated" by RRC signaling. As a result, UL transmission without grant can be performed by a UE after semi-static resource configuration by RRC without any L1 activation.

Grant-Free Resource Configuration Option B: Activation/Deactivation Based Scheme In this scheme, the grant-free resources are configured by both higher-layer/RRC signaling and L1/group common PDCCH signaling before a grant-free user starts a UL data transmission.

For RRC resource configuration, it is same as one provided in section GRANT-FREE RESOURCE CONFIGURATION OPTION A: RRC BASED SCHEME.

For the group common PDCCH based signaling, the parameters or contents in the signaling include user resource activation/deactivation/release, ACK/NACK feedback or acknowledgement to UL data transmissions from grant-free and or grant-based users. Moreover, the L1 signaling can also perform link parameter update on, e.g., MCS, K, power control, etc.

In this option, by default, F1 is set to "enable," which allows a L1 activation and deactivation for grant-free configuration, and F2 is set to "de-activated" by RRC. As a result, after the semi-static resource configurations by RRC, a grant-free user has to wait for L1 or group common PDCCH activation signaling before UL grant-free transmission.

Grant-Free Resource Configuration Option C: Activation/Deactivation Based Scheme In this scheme, the grant-free resources are configured by both higher-layer/RRC signaling and L1/DCI (or UE specific PDCCH) signaling before a grant-free user starts a UL data transmission.

For RRC resource configuration, it is same as one provided in section GRANT-FREE RESOURCE CONFIGURATION OPTION A: RRC BASED SCHEME.

For the DCI based signaling, the parameters or contents in the signaling include user resource activation/deactivation/release. Moreover, the L1/DCI signaling can also perform link parameter update on, e.g., MCS, K, power control, etc.

In this option, by default, F1 is set to "enable," which allows a L1 activation and deactivation for grant-free configuration, and F2 is set to "de-activated" by RRC. As a result, after the semi-static resource configurations by RRC, a grant-free user has to wait for L1 or DCI activation signaling before UL grant-free transmission.

Grant-Free Resource Configuration Option D: Activation/Deactivation Based Scheme In this scheme, the grant-free resources are configured by both higher-layer/RRC signaling and L1/DCI signaling before a grant-free user starts a UL data transmission.

For RRC resource configuration, it is same as one provided in section GRANT-FREE RESOURCE CONFIGURATION OPTION A: RRC BASED SCHEME.

In this case, a grant-free transmission can be switched to grant-based transmissions temporarily or permanently by L1/DCI schedule and grant signaling, where one more parameter can be defined to indicate the switching type such as just for this TB transmission or switching to grant-based transmission permanently. In some embodiments, a grant-free transmission of a user TB can be switched to grant-based transmissions for the user TB by L1/DCI schedule and grant signaling, where a temporary switching is assumed. In some embodiments, a grant-based transmission can be switched to grant-free transmission, for example, using scheduling request from the grant-based user to indicate a grant-free transmission request. In other embodiments, a grant-based transmission user may take a grant-free resource for a scheduling request to save request latency, where the SR may include the request information such as traffic type, buffer size, numerology, grant-free or grant-based transmission type, and a new MCS selection, etc. In another embodiment, a grant-free resource can be used exclusively by one or more users for transmission of control messages including SR, UL feedback, measurement reports, etc.

For the DCI based signaling, the parameters or contents in the signaling include user resource deactivation/release/re-activation, ACK/NACK feedback or acknowledgement to UL data transmissions from grant-free and or grant-based users. Moreover, the L1/DCI signaling can also perform link parameter update on, e.g., MCS, K, power control, etc.

In this option, by default, F1 is set to "enable," and F2 is set to "activated" by RRC. As a result, UL transmission without grant can be performed by a UE after semi-static resource configuration by RRC without any L1/DCI activation, but the DCI signaling is able to switch an ongoing grant-free transmission to a grant-based transmission, as well as to apply the grant-free resource deactivation, release, or re-activation (or re-activation with a grant-free resource configuration after the resource release signaling).

Grant-Free Resource Configuration Option E: Activation/Deactivation Based Scheme In this scheme, the grant-free resources are configured by both higher-layer/RRC signaling and L1/DCI (or UE specific PDCCH) signaling before a grant-free user starts a UL data transmission, where all the associated grant-free resources will split into two parts to be configured separately by RRC signaling and L1 signaling.

In some embodiments, except for the grant-free resources of time/frequency/MCS(s)/the number of repetition K(s), which will be configured by L1 signaling, the other resources can be configured by RRC signaling in a way similar to one described in section GRANT-FREE RESOURCE CONFIGURATION OPTION A: RRC BASED SCHEME. In other embodiments, the grant-free resources listed in section GRANT-FREE RESOURCE CONFIGURATION OPTION A: RRC BASED SCHEME can be split into two portions in quite different ways, for example, RS, hopping pattern and HARQ process can be also configured by L1/DCI signaling.

For the DCI based signaling, the parameters or contents in the signaling include user resource activation/deactivation/release. In some embodiments, DCI can also configure the grant-free resources of time/frequency/MCS(s)/the number of repetition K(s) for a user or a group of users (with a same group ID); in other embodiments, DCI can also configure the grant-free resources of time/frequency/MCS(s)/the number of repetition K(s), plus RS, hopping pattern and HARQ process for a user or a group of users. Moreover, the L1/DCI signaling can also perform link parameter update on, e.g., MCS, K, power control, etc.

In this option, by default, F1 is set to "enable," which allows a L1 activation and deactivation for grant-free configuration, and F2 is set to "de-activated" by RRC. As a result, after the semi-static resource configurations by RRC, a grant-free user has to wait for L1 or DCI activation signaling before UL grant-free transmission.

Grant-Free Resource Configuration Option F: a Combination of RRC Configuration and DCI/Layer 1 Signaling Scheme In this scheme, the grant-free resources are configured by both higher-layer/RRC signaling and L1/DCI (or UE specific PDCCH) signaling before a grant-free user starts a UL data transmission, where all the associated grant-free resources will split into two portions to be configured separately by RRC signaling and L1 signaling.

In some embodiments, the grant-free resources of time/frequency/MCS(s)/the number of repetition K(s), RS, hopping pattern and HARQ process are configured by DCI/L1 signaling for a user or a group of users (with a same group ID), and the other resources can be configured by RRC signaling in a way similar to one described in section GRANT-FREE RESOURCE CONFIGURATION OPTION A: RRC BASED SCHEME. Moreover, RRC will also configure periodicity parameters and resource usage timer(s), etc.; for URLLC services, the periodicity can be set a small number (e.g., 1) and the resource timers can be set a large number (e.g., infinity).

For the DCI based signaling, the parameters or contents in the signaling include user resource activation/deactivation/release. Moreover, the L1/DCI signaling can also perform link parameter update on, e.g., MCS, K, power control, etc.

In this option, by default, F1 is set to "enable," which allows a L1 activation and deactivation for grant-free configuration, and F2 is set to "de-activated" by RRC. As a result, after the semi-static resource configurations by RRC, a grant-free user has to wait for L1 or DCI activation signaling before UL grant-free transmission.

Resource Configuration Signaling Conflict and Resolution

A grant-free resource or a group of resources configured for a user can be activated, deactivated, released, reconfigured and/updated in a semi-static way, a dynamic way, and a combination of both ways. The semi-static way includes using base station signaling such as RRC, broadcast, multicast, and/or others; the dynamic way includes using signaling such as user specific DCI, group common PDCCH, and/or others.

However, L1/dynamic signaling and higher layer signaling may have a conflict when configuring, reconfiguring, and/updating user resources/parameters, for example, either applying different values to a same parameter or a controversial action indication to a same user. This is due to the possibility of different types of signaling from L1 and higher-layer control messages applicable to same resource, parameter and/or grant-free user. For example, the semi-static/higher layer signaling may be used to reconfigure a MCS, $MCS_i$ and the dynamic/L1 signaling may be used to update a different MCS, $MCS_k$ for a user or resource in a same time interval. In this case, the conflict resolution rule should be pre-defined or pre-configured such that the user can follow the instructions without ambiguity; for example, if two different MCSs are indicated due to the signaling conflict, the more robust MCS will be used, or DCI/L1 signaling may overwrite the semi-static signaling, or the semi-static signaling may overwrite the dynamic/L1 signaling, or a later signaling may overwrite the earlier signaling, etc.

Grant-Free User Behavior in RRC Connected Mode with DRX

A grant-free transmission user in a RRC connected state can apply DRX configuration by a DRX scheme that can be independent of grant-free resource configuration; for example, the current LTE DRX or NR DRX configuration and signaling procedure can be used for grant-free transmissions, a same way as grant-based transmission DRX configuration. As a grant-free user has configured the grant-free resources in the RRC connected state, user behavior and base station handling of the configured grant-free resources during DRX ON/OFF cycle are described below.

From UE perspective, it can use its configured grant-free resources right away if needed after it is in DRX ON period. It can be optionally configured to enable awake up during DRX OFF period for a grant-free data transmission upon a packet arrival, where the UE behavior should be defined in this case regarding how to design a mechanism (for example, an impact on DRX ON/OFF cycle should be described, and at least, a one-bit temporary DRX user ON parameter (to enable this early wake-up or not) and its active duration definition after the data transmission are required, etc.) to work smoothly with current DRX operations.

From the base station perspective, the grant-free resource of a grant-free user in DRX OFF period may or may not be used by other traffic or users, which should be implementation issues. Depending on a design if allowing a grant-free user to wake up for a data transmission during DRX OFF period (upon a data arrival), the base station may have a better idea on if it could try to "borrow" and schedule/grant other users or traffic to transmit in the grant-free resources of the grant-free user (in the DRX cycle).

A user can be configured to monitor DL control channel with DRX ON period in terms of slot, mini-slot, or OFDM symbol with respect to the numerology of the DL control channel, but this may not be applied to all type of the users and/or use-cases.

Grant-Free Resource Configuration in Inactive or Idle Mode

A user with grant-free and/or grant-based transmissions can apply an inactive timer to release its RRC connection and at least physical time/frequency resources to enter either inactive or idle mode in order to save user power or energy, where only partial or no RRC connection resources/contexts can be maintained.

In some embodiments, UE can transmit small data without a state transition to RRC connected mode by using grant-free transmissions. The grant-free resources can be broadcasted or multi-casted to a group of users with a group ID, e.g., a group RNTI per group of users for uplink transmissions, which may or may not be the same as a paging ID for DL transmissions. A group ID can be pre-defined or pre-configured for a user during the user initial network entry or a connection setup. A group of users with a same group ID can share the same time and frequency resources (and optionally MCS, K, etc.) configured to them, while a RS for each user can be different, which can be pre-defined by mapping a user (e.g., using its UE ID) to one or more RSs in a predefined RS pool or randomly selected from the RS pool. Moreover, the paging/DRX parameters (Tc, nB) of a group of users can also be configured by broadcasting while UE specific DRX cycle (TUE) can be configured via Non-Access Stratum (NAS) signaling.

In other embodiments, the grant-free resources in Inactive or idle mode can be pre-defined, including time/frequency/RS, as well as other parameters such as MCS, K and PC. In another embodiment, a user in an Inactive state or idle mode can be configurable or optional to take all or part of the resource and/or parameter configurations in its RRC connected state.

Some embodiments provide grant-free and grant-based transmissions with shared signaling for configuration and control. In general, the grant-free and grant-based transmissions and users can share one or more common types of control signaling such as DCI, RRC, broadcasting, etc., for the resource and/or parameter configuration, e.g., numerology and sub-band division parameter configuration from broadcasting or RRC signaling, MCS update from DCI, etc. A shared signaling format can be the same as the LTE grant-based one or NR grant-based format; or a shared signaling format can be a command format modified from grant-based signaling format or a harmonized signaling format for grant-based and grant-free transmission configuration.

Some embodiments include a scheduling request that uses the grant-free resource to reduce latency. In some embodiments, the grant-free resources are configured for data transmissions, control message transmissions (dedicated for a user or shared by a group of users), or a combination of both control and data transmissions. For example, an enhanced scheduling request (SR) is designed to use a grant-free resource to reduce the request latency, which may or may not be shared by multiple users. For a grant-free resource configured only for control messages such as SR, UE feedback, or measurement reports, the grant-free resource may or may not be shared by multiple users.

Some embodiments provide grant-free resource configuration by RRC with configurable DCI and/or RRC based resource activation, deactivation or release, as described in the Grant-Free Resource Configuration Options B-F sections above.

Some embodiments provide resolution of the resource configuration signaling conflict due to dual controls from L1 and DCI. L1 signaling and higher layer signaling may have a conflict, for example, either applying different values to a same parameter or a conflicting action indication to a same user. This is due to the possibility of different types of signaling from L1 and higher-layer control messages applicable to same resource, parameter and/or grant-free user. For example, the semi-static/higher-layer signaling may be used to reconfigure a MCS, MCSi, and the dynamic/L1 signaling to update a different MCS, MCSk for a user or resource in a same time interval. In this case, the conflict resolution rule should be pre-defined or pre-configured such that the user follows the instructions without ambiguity; for example, if two different MCSs are indicated due to the signaling conflict, the more robust MCS will be used, or DCI/L1 signaling may overwrite the semi-static signaling, or the semi-static signaling may overwrite the dynamic/L1 signaling, or a later signaling may overwrite the earlier signaling, etc.

Some embodiments provide grant-free user behavior in RRC connected mode with DRX. Some embodiments provide grant-free resource configuration in inactive or idle mode.

Grant-Free Resource Configuration Option G:

The base station will configure grant-fee resources and/or parameters for an UE or a group of UEs which applies grant-free transmission scheme to transmit uplink data and/or control information. The base station configures grant-free resources and parameters for the UE or the group of UE through an RRC signaling. The grant-free resources at least comprise time-frequency resources. The grant-free parameters comprise at least one of the following: RS parameters, MCS index (or indices) or equivalent transmission block size, number of repetition K, power control parameters, numerology, sub-band option.

Figure 3:
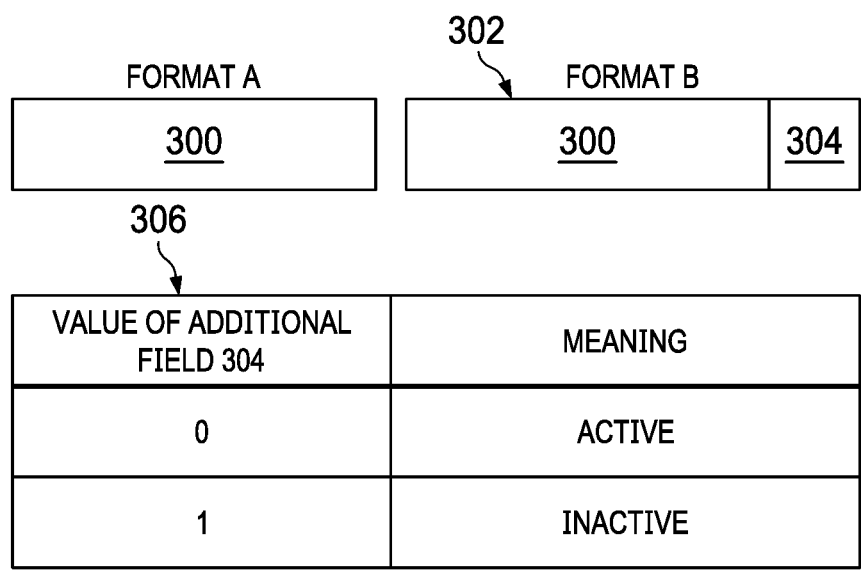
FIG. 3 shows example of two formats of RRC signaling: format A and format B.

In this option, the base station may use the RRC signaling of two formats (format A, and format B) to configure grant-free resources and parameters for an UE. FIG. 3 shows an example of two formats: format A 300 and format B 302. In an example, the difference between the format A 300 and format B 302 is that format B 302 has an additional filed 304. The additional field 304 may occupy one bit or multiple bits. As an example, the additional field 304 in FIG. 3 occupies one bit. The additional field 304 can be used to indicate an initial state of the grant-free resources and parameters to be configured by the signaling of the format. The initial state can be active or inactive. For example, as table 306 shows, a value (for example, "0") of the additional field 304 is used to indicate the "active" state, and another value (for example, "1") of the additional field 304 is used to indicate the "inactive" state. If the additional field 304 indicates "active", it means the grant-free resources and parameters can be used immediately without being activated by a further signaling (for example, layer-1 signaling, DCI) from the base station. If the additional field 304 indicates "inactive", it means the grant-free resources and parameters can only be used when a signaling (for example, layer-1 signaling, DCI) for activating them is received by the UE.

If the base station uses a signaling of the format A to configure grant-free resources and parameters for the UE, the UE performs UL transmission without UL grant by using the grant-free resources and parameters indicated by the received RRC signaling. In this scenario, the grant-free resources and parameters can be used by the UE for transmitting uplink data without being activated by Layer-1 signaling such as DCI. In other words, the grant-free resources and parameters configured by the RRC signaling of the format A are active.

If the base station uses a RRC signaling of the format B to configure grant-free resources and parameters for the UE, the UE configures the grant-free resources and parameters basing on the RRC signaling, and the configured grant-free resources and parameters can be subjected to the a further signaling (for example, Layer-1 signaling, DCI, RRC signaling) from the base station. The further signaling can be used to activate, deactivate, modify, or release at least part of the grant-free resources and parameters. When the further signaling is used to influence state of part of the grant-free resources and parameters, the further signaling may comprise information indicating which part of the grant-free resources and parameters needed to be activated, deactivated, modified, or released. The further signaling (for example, Layer-1 signaling, DCI, RRC signaling) can be used for activating, deactivating, releasing, updating, and/or modifying the at least part of the grant-free resources and/or at least part of the grant-free parameters.

In an example, L1 signaling can modify at least time and frequency resources, including the resource allocation time-frequency sizes. The L1 signaling can be sent less frequent than grant-free transmission opportunities. The L1 signaling L1 can be used at modified or updated parameters include the associated transmission parameters, such as RS, MCS, power control, numerology, sub-band option, etc.

If the additional field 304 in the RRC signaling indicates the "active" state, the grant-free resources and parameters can be used immediately for transmitting uplink data without obtaining UL grant. If the additional field 304 in the RRC signaling indicates the "inactive" state, the grant-free resources and parameters cannot be used for UL transmission until a further signaling (for example, layer-1 signaling, RRC signaling) for activating the grant-free resources and parameters.

To keep the stable grant-free transmissions with possible RRC resource reconfiguration and L1 signaling for resource and parameter updates, there is a mechanism to coordinate L1 signaling and RRC reconfiguration to avoid things such as signaling conflict, both types of signaling in a same TTI. In other embodiment, after a L1 signaling for resource changes, RRC reconfiguration on resource changes can be skipped if it is too close in time (e.g., a few TTIs) to the L1 signaling.

Bandwidth Part Configuration and Activation/Deactivation for Grant-Free Transmissions A bandwidth part (BWP) is a portion or all of the system bandwidth in a carrier frequency band, which will be allocated to a UE for DL or UL transmission. One UE can configure one or more BWPs by RRC signaling, while one or more BWPs can be activated as active BWPs at a given time for a serving cell by DCI or RRC signaling; and one or more active BWPs can be de-activated/switched (e.g., to a default active BWP) by DCI signaling, RRC signaling, or a timer-out.

For grant-free resource configurations, the grant-free time and frequency resources are associated with one or more bandwidth parts, as the grant-free frequency resources should be allocated within one or more BWPs as a BWP configuration will include a frequency bandwidth and frequency location for the BWP. In some embodiments, one or more BWPs can be configured by a dedicated RRC signaling for the bandwidth part configuration only before the GF resource configurations for a GF UE. Thus, the grant-free resources to be configured should be within a BWP and can use the BWP location as a frequency reference to configure grant-free frequency domain resources; for example, using the BWP starting location (e.g., a PRB index) to define the relative frequency location(s) for the grant-free UE frequency resources in the BWP, or alternatively, using absolute frequency location(s) (e.g., starting RB number and length in frequency domain in RB s) for the grant-free UE frequency resources such that they are within the BWP. In other embodiments, one or more BWPs for a UE can be configured in the same RRC signaling for the UE grant-free resource configuration, where one or more sets of grant-free resources have to be put within one or more BWPs. In some embodiments, the frequency domain allocation parameter for grant-free resource configuration can be expanded to include the parameters of one or more BWPs. For example, the expanded frequency domain allocation can include a frequency bandwidth and frequency location of one BWP, numerology, and the frequency domain location(s) relative to the BWP starting location for one or more grant-free resource configurations, as well as numerology; the expanded frequency domain allocation can also include one or more BWP configurations, each includes the associated the frequency domain location (s) for one or more the grant-free resource configurations. Moreover, the activation and/or de-activation/re-configuration on BWP(s) and/or grant-free resource configurations can be done by using one or more BWP indices if two or more BWPs (each with a unique BWP index) are configured for the UE. A GF resource configuration can also be per carrier based where a common relative allocation associated with each BWP for GF resources in frequency domain has to be defined or configured in the GF resource configuration.

A UE's BWP configuration with one or more BWPs can be configured first, and GF frequency resources in one or more resource configurations can be configured after, each being associated with each of the BWPs. Alternatively, each GF resource configuration can include both one or more BWP configurations and associated GF frequency resources and other resources and parameters. In some embodiments, triggering or activating a grant-free resource will also trigger or activate the associated BWP as active BWP (and no additional BWP switching signaling is required); and triggering or activating a BWP as active BWP will also make one and/or more GF resource configurations allocated in the BWP as active resources, and optionally for multiple GF resource configurations, one or more signaling messages can be applied to activate the GF resource resources in a different GF resource configuration. De-activating a grant-free resource will also de-activate the associated BWP as inactive BWP (and no additional BWP switching signaling is required); and de-activating a BWP as inactive BWP will de-activate all GF resource configurations allocated in the BWP as inactive resources, and no additional de-activation signaling is required for the GF resource de-activation in the associated BWP. The signaling scheme in above can be RRC and/or DCI.

For a RRC only resource configuration on grant-free transmission, one or more BWPs can be configured by the same RRC signaling for the resource configuration or a dedicated RRC signaling for the bandwidth part configuration only; one or more BWPs can be activated as active BWP(s) at a given time for a serving cell by another dedicated RRC signaling or the RRC signaling for the GF resource (re-)configuration. In some embodiments, one or more BWP(s) can be defined as active or default active BWP(s) within the RRC only GF resource (re-) configuration or by one dedicated RRC signaling. If multiple BWPs have been configured previously by one dedicated RRC signaling other than the RRC only signaling for GF resource configuration, the BWP configurations can include BWP indices, where one BWP index refers to each unique BWP configuration. As a result, a BWP index can be used for the BWP activation and de-activation/switching (to an active BWP or a default active BWP). For multiple GF resource (re-)configurations, each GF resource (re-)configuration can include the parameters of one or more BWP configurations (or alternatively, one or more BWP indices) to configure, activate, and/or deactivate the one or more BWPs, wherein the GF resources from a GF resource (re-)configuration are valid to be used only in one or more active BWPs that are included in the GF resource (re-)configuration. Alternatively, the multiple GF resource (re-)configurations can share and include the parameters of one or more BWP configurations, wherein the GF resources from the multiple GF resource (re-)configurations are valid to be used only in one or more active BWPs that are included in the multiple GF resource (re-)configurations.

For a combination of RRC and DCI signaling resource configuration on grant-free transmission, the BWP configuration can be done in the RRC or DCI signaling for GF resource configuration (which includes the resource re-configuration, activation, deactivation/release, and/or parameter update, etc.), or can be done in a dedicated RRC or DCI signaling for the bandwidth part configuration. One or more BWPs (or their BWP configuration indices reference to the BWPs) can be explicitly activated as active BWPs or defined as default active BWPs in the RRC or DCI signaling for GF resource configuration, or can be done in a dedicated RRC or DCI signaling for the bandwidth part configuration. Moreover, one active BWP (or one active BWP index) of a UE can be de-activated or switched, by the RRC or DCI signaling for GF resource configuration, by a dedicated RRC or DCI signaling for the bandwidth part configuration, or based on a timer, to another BWP (or BWP index) or other BWPs (or BWP indices) among the configured BWPs. One or more default active BWPs can be pre-defined or pre-configured for a UE by the RRC or DCI signaling for GF resource configuration, by a dedicated RRC or DCI signaling for the bandwidth part configuration. The GF resources configured from a RRC or DCI signaling for GF resource configuration are valid to be used only in one or more active BWPs that are included in the RRC or DCI signaling for GF resource configuration.

The configuration on a BWP includes numerology (e.g., subcarrier spacing and CP length), starting frequency domain location and the frequency domain length (e.g., in the number of RBs), optionally signal waveform, etc. A UE is configured with BWP in terms of PRBs and an offset between BWP and a (frequency domain) reference point is implicitly or explicitly indicated to UE, wherein the reference point can be, e.g., center/boundary of NR carrier, or common PRB indexing starting point such as PRB0.

The numerology of UL BWP configuration is applied to at least PUCCH, PUSCH & corresponding DMRS; the numerology of DL BWP configuration is applied to at least PDCCH, PDSCH & corresponding DMRS.

The BWP configuration can be UE specific, UE group-based, or cell specific, depending on the scenarios such as UE connection states (e.g., RRC connected, Inactive or Idle state). In some embodiments, a UE in RRC connected state can apply RRC only for GF resource configuration or a combination of RRC and DCI signaling for GF resource configuration for UE specific BWP configuration and/or activation/de-activation/switching; in the inactive state, the BWP configuration and/or activation/de-activation may be applied by broadcast or multi-cast signaling for cell-based or group-based UEs. For GF transmission, the configuration, an activation and/or a deactivation of DL and/or UL bandwidth parts can be done by means of dedicated RRC signaling or DCI signaling, different from the signaling for GF resource configurations, where the activation can be performed in the bandwidth part configuration; and if a UE is configured with multiple BWPs, each with a different BWP configuration index, BWP index/indices can be used for the activation or deactivation by UE specific RRC signaling or DCI signaling.

GF RNTI and HARQ Feedback Details

A GF RNTI, different from grant-based C-RNTI, is configured for a UE (or for a group of UEs) for, e.g., HARQ feedback and UL grant-based retransmission (GF2GB switching), and resource activation/deactivation, parameter update, as well as UL data scrambling or CRC scrambling, etc. For HARQ feedback in identifying a TB HARQ process ID of a UE, the base station has to detect the UE by, e.g., UL UE/TB specific DMRS/RS. If both RS and data have been successfully decoded, the GF RNTI can be used to acknowledge the TB of the UE by either UL grant with TB HARQ process ID, RS, and/or NDI (e.g., 0); or group common PDCCH for a list of info for the group of UEs, each in the list with a bit map to indicate one bit value (e.g., for yes in this case), which TB in which time-frequency resources, and/or which RS.

In case where the RS has been successfully decoded but not the data has a detection failure, the GF RNTI can be used to negatively acknowledge the TB of the UE by either UL grant with TB HARQ process ID, RS, and/or NDI (e.g., 1); or group common PDCCH for a list of info for the group of UEs, each in the list with a bit map to indicate one bit value (e.g., for no in this case), which TB in which time-frequency resources, and/or which RS. In some embodiments, RS(s) with optionally time-frequency frequency can be used to indicate NACK for data detection failures from one or more UEs/TBs.

Initial Transmission Identification

For grant-free transmissions, UE traffic can arrive any time but initial transmission timing should be detected or identified such that HARQ operations such as HARQ process ID, redundant version number can work. To identify initial transmission time upon traffic arrival, different schemes can be used to do so. For example, GF transmission for a TB may take different DMRSs (or RS cyclic shifts) for its initial transmission and the subsequent transmissions. In another embodiment, some special time-frequency resources can be used for initial transmissions, for example, initial transmissions can be performed in certain pre-defined or pre-configured time and/or frequency resources. A combination of time, frequency and/or RS can also be used for initial transmission time identification.

GF Configuration with Mini-Slot

For RRC only resource configuration on GF transmission, both UE and gigabit Node B (gNB) have to have the same knowledge of what the configured frame structure on TDD looks like, e.g., multiple slot types: DL only, UL only, DL centric and UL centric; or self-contained slot: starting from downlink control and ending with uplink control in a slot with fast SRS/CQI and flexible HARQ timing; as well as the configured mini-slot allocations (each with starting symbol position and duration) in a slot, e.g., where and how many 2-symbol mini-slots are allocated in the slot or 7-symbol mini-slot for DL, UL or both links in the slot. The configuration can be semi-static, for example, a sub-frame information message from group common PDCCH. For grant-free transmissions with a combination of RRC and DCI signaling, both semi-static and/or dynamic signaling configuration can be supported. Furthermore, the frame structure and mini-slot configuration can be applicable to FDD as well.

The grant-free time domain resource configuration can apply one periodicity parameter, where the periodicity can be used to define the grant-free transmission occasions for both initial and repetitions explicitly or to define the grant-free only initial transmission occasions while the transmission occasions for the subsequent repetitions are defined implicitly, such as bundling like LTE. In other embodiments, the grant-free time domain resource configuration can apply two periodicity parameters, where, explicitly, one periodicity defines the grant-free transmission occasions for initial transmissions and the other defines the grant-free transmission occasions for the subsequent repetitions. A periodicity parameter can indicate an absolute timing units such as how many slots between two neighboring transmission resource occasions to be configured by the periodicity for a FDD; a periodicity parameter can indicate (or count) the number of available basic resource units such as how many mini-slots between two neighboring transmission resource occasions to be configured by the periodicity for a TDD.

Given the configured GF transmission occasions, an initial TB transmission can be performed at a fixed transmission occasion, can be performed at any transmission occasion, or can be configurable (one of the two options) to operate initial transmissions either (Option 1) in fixed transmission occasions or (Option 2) any transmission occasions, by semi-static/RRC signaling or dynamic/DCI signaling. In one embodiment, which option to be configured for initial transmissions can be based on certain considerations such as application/service types/requirements. For the Option 2 configuration, the initial transmission timing for, e.g., HARQ ID determination, RV sequence number determination, etc., different schemes can be determined by the ways as described in the previous paragraphs.

Pusch and UL Control Resource Configuration

For physical uplink shared channel (PUSCH) and/or UL control resource configuration on UL transmission without a dynamic grant and/or grant-based transmission, and on slot-based and/or non-slot scenario(s), one can employ the following formula to determine the resource and transmission occasions for one or more UEs:

$$\lfloor 14(10(n_f - O)2^u + n_s) + n_{symbol} - n_{symbol\_offset} \rfloor \bmod P = 0$$

In the above formula, the operator $\lfloor X \rfloor$ denotes the largest integer number less than or equal to X. $n_f$ is a system frame number, or index, in the system (starting from 0), O is an offset relative to the start of the system radio frame (i.e., SFN #0), and each frame consists of 10 1-ms sub-frames. u is an integer number indicating the configuration of a numerology in terms of subcarrier spacing option (e.g., 0, 1, 2, and 3 for 15 kHz, 30 kHz, 60 kHz, and 120 kHz), where the 15 kHz is used as the reference subcarrier spacing option with u=0. $n_s$ is a slot index within a system frame, starting from 0 to 140 $2^u-1$, for a given numerology configuration of u. $n_{symbol}$ is within a slot a symbol index starting from 0 to 13. $n_{symbol\_offset}$ is a (pre-) configurable, e.g. by RRC or, equivalently, L1 signaling, or predefined symbol offset within a slot. For a slot-based configuration, $n_{symbol\_offset}$ can be zero by default, and for non-slot based configuration, $n_{symbol\_offset}$ can be zero or a positive integer e.g. from 1 to 13. P is the resource periodicity in terms of the number of symbols (or in terms of slots, or time units), indicating a time distance, for example, in # of symbols, between two neighboring PUSCH or control channel resource occasions among the repeated and periodic resources.

Furthermore, when O is defined by an offset in terms of the number of sub-frame numbers from the start of a system radio frame, and the other parameters are kept same as described in the above paragraph, one can use the following formula to determine the resource and transmission occasions:

$$\lfloor 14((10n_f-O)2^u+n_s)+n_{symbol}-n_{symbol\_offset} \rfloor \bmod P=0$$

Grant-Free Resource Configuration Option H

Compared to the options A-F, this option differs from them only in that the F1 and F2 in RRC signaling have been replaced with one field, and the other part are the same with the options A-F. This one field may have multiple values, different values indicates different status of the grant-free resources and parameters. For example, the field may occupy tow bits. When the field has a value of "00", it means UL transmission without grant can be performed by a UE by using the grant-free resources and parameters, after the semi-static configuration (without any L1/DCI further activation), which at least can be used for configuration of URLLC applications and services, and cannot be deactivated, and/or updated, and/or modified, or released by a L1 signaling. When the field has a value of "10", it means that the grant-free resources and parameters needs to be activated by using another signaling from the base station, and can also be modified, or updated, released by another signaling. When the field has a value of "11", it means that the grant-free resources and parameters can be used without being further activated, and can be deactivated, modified, updated, or released by another signaling.

Some More Detailed Descriptions on Grant-Free Transmission Modes

There are multiple grant-free transmission options to configure resources and associated parameters and operate in different ways, and UE and gNB may follow different operational behaviors.

Option 1 defines and includes two UL scheduling-request (SR) free data transmission modes: mode A and mode B. SR free means that there is no scheduling request.

Figure 4A:
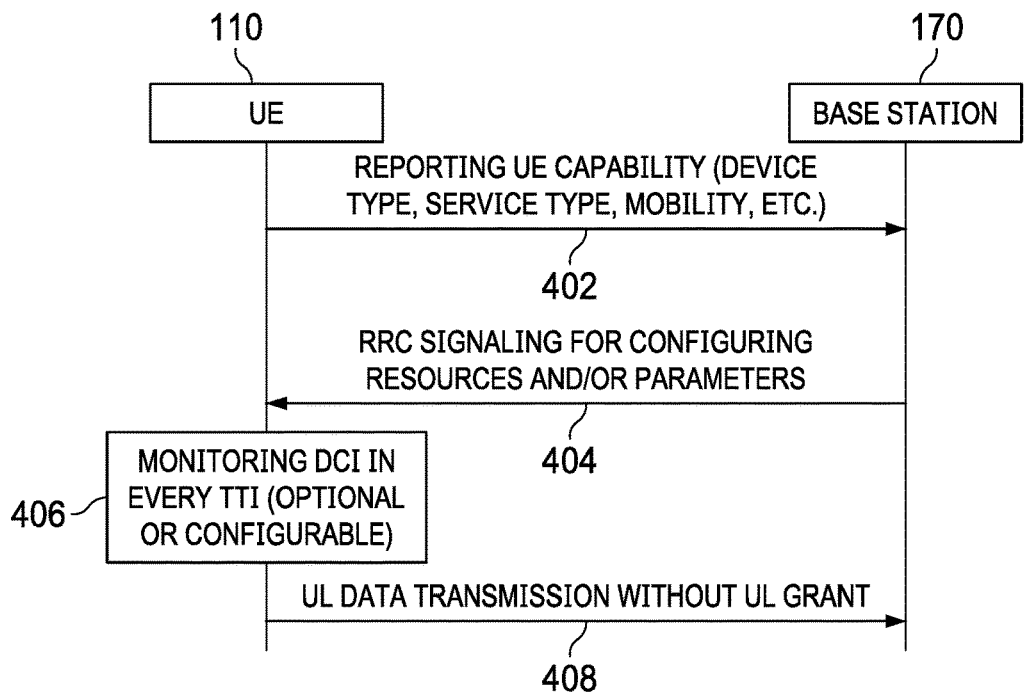
FIG. 4A is a flowchart of UL scheduling request (SR) free data transmission mode A.

In mode A, referring to FIG. 4A, base station 170 configures (404) transmission resources and parameters via RRC signaling for UE 110, the UE does not need (406) to (periodically, for example, every TTI) monitor PDCCH grant information (for example, DCI), including activation/deactivation/releasing signaling, transmission parameter update signaling, UE may or may not need to detect ACK signaling (early termination with ACK, predefined transmission times without ACK), the grant-free resource activation, deactivation or release is done by one- or more-bit control message via RRC signaling. Once there is UL data needed to be transmitted, the UE applies at least part of the resources and parameters configured via the RRC signaling for transmitting (408) the UL data without obtaining an UL grant. In this mode, RRC signaling will be used to handle all the resource configuration and reconfigurations, such that no DCI signaling is used at all in this case.

Figure 4B:
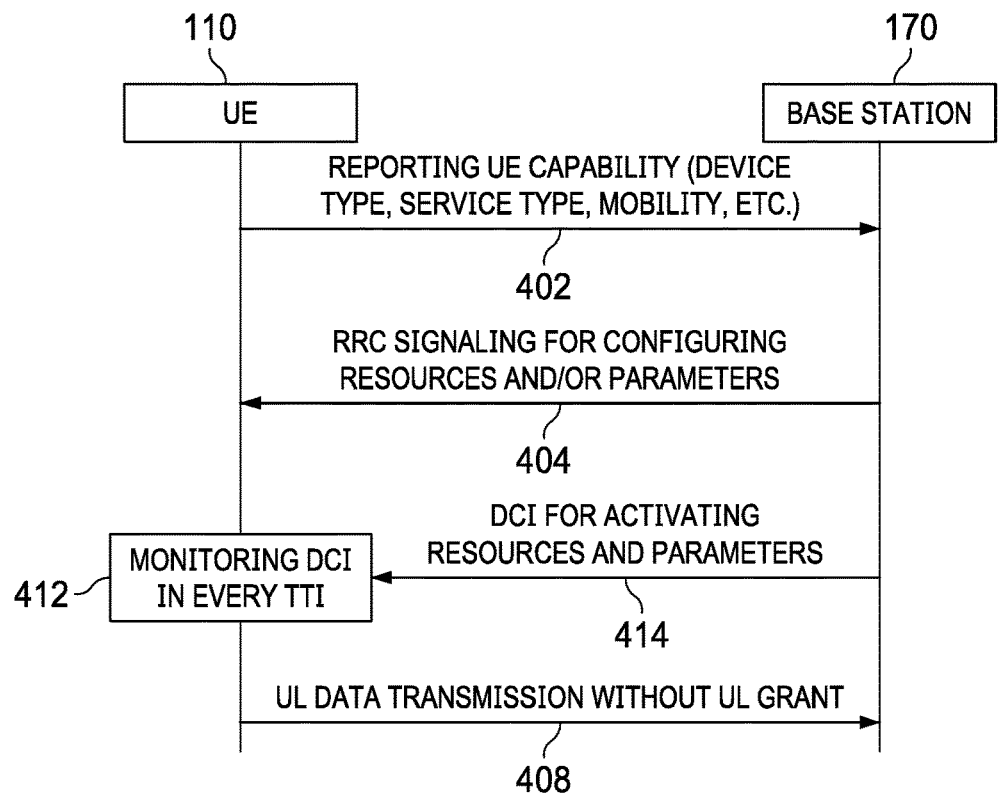
FIG. 4B is a flowchart of UL scheduling request (SR) free data transmission mode B.

In mode B, referring to FIG. 4B, base station 170 configures (404) transmission resources and parameters via RRC signaling for UE 110, but the configure transmission resources and parameters cannot be used to transmit UL data until L1 activation signaling (for example through PDCCH) for activating at least part of the resources and parameters is received; the UE needs to monitor (412) DCI in each TTI for potential transmission parameter modifications; if it is a signaling (414) for deactivating at least part of the grant-free resources and parameters that has been monitored in step 412, UE can stop using of the part of the configured grant-free resources and parameters; if it is a DCI grant signaling that is received in step 412, the UE can switch to grant-based transmission. Once there is UL data needed to be transmitted, the UE then implements the step 408.

In Option 2, SR free transmission resources and parameters are configured by RRC signaling, in which one additional indicator is used to indicate if L1/DCI signaling is employed or not for the resource activation, deactivation/release, and parameter modifications, etc., thus we have modes: Mode C (DCI disabled mode) and Mode D (DCI enabled mode). The mode type can be pre-defined, or pre-configure by RRC signaling.

Figure 4C:
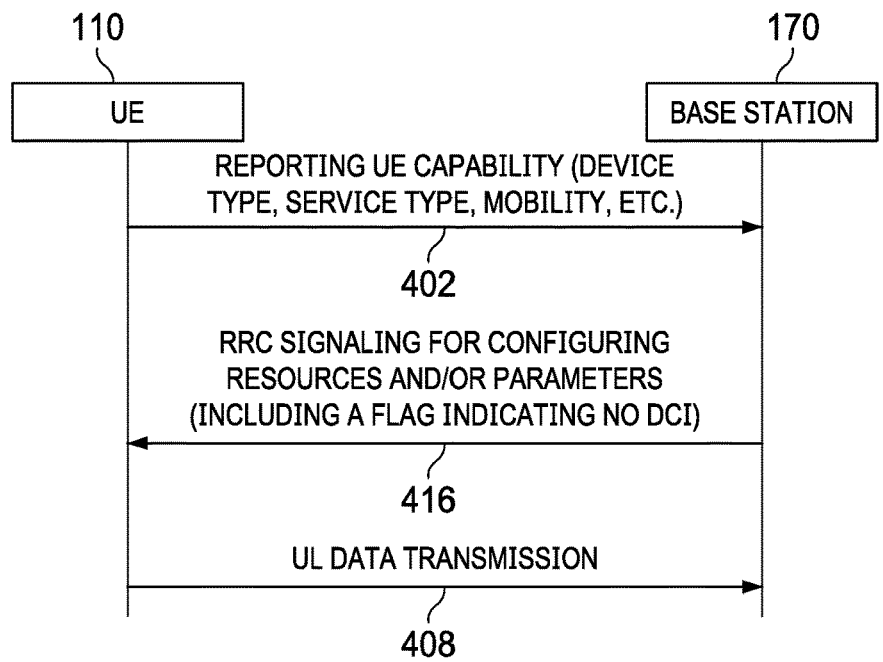
FIG. 4C is a flowchart of UL scheduling request (SR) free data transmission mode C.

In Mode C, referring to FIG. 4C, base station 170 configures (416) grant-free resources and parameters via RRC signaling for UE 110, where the RRC signaling includes an indicator for indicating no DCI needed for activating the grant-free resources and parameters, the UE does not need (406) to (periodically, for example, every TTI) monitor PDCCH grant information (for example, DCI), including activation/deactivation/releasing signaling, transmission parameter update signaling, UE may or may not need to detect ACK signaling (early termination with ACK, predefined transmission times without ACK), the grant-free resource activation, deactivation or release is done by one- or more-bit control message via RRC signaling. Once there is UL data needed to be transmitted, the UE applies at least part of the resources and parameters configured via the RRC signaling for transmitting (408) the UL data without obtaining an UL grant. In this mode, RRC signaling will be used to handle all the resource configuration and reconfigurations. As a result, no DCI signaling is used at all in this case and UE may or may not monitor, in each TTI, L1 signaling such as PDCCH, which can be configured by gNB based on UE capability report.

Figure 4D:
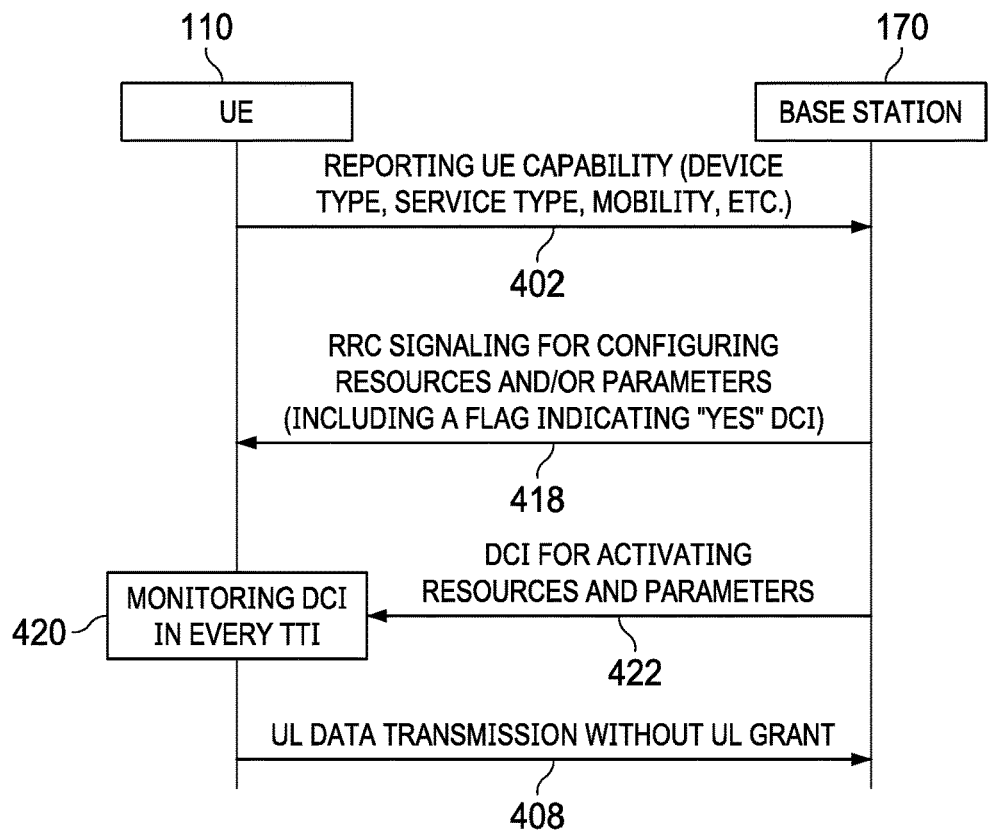
FIG. 4D is a flowchart of UL scheduling request (SR) free data transmission mode D.

In Mode D, referring to FIG. 4D, the base station 170 configures (418) transmission resources and parameters via RRC signaling for UE 110, but the RRC signaling includes an indicator for indicating the configure transmission resources and parameters cannot be used to transmit UL data until L1 activation signaling (for example through PDCCH) for activating at least part of the resources and parameters is received; the UE needs to monitor (420) DCI in each TTI for potential transmission parameter modifications; if it is a signaling (422) for deactivating at least part of the grant-free resources and parameters that has been monitored in step 420, UE can stop using of the part of the configured grant-free resources and parameters; if it is DCI grant signaling that is received in step 940, the UE can switch to grant-based transmission. Once there is UL data needed to be transmitted, the UE then implements the step 408.

The UE may report (402) its UE capability such as traffic/service type, device type, mobility, etc. to the base station. The base station can decide which grant-free transmission option or which mode is used basing on the reported capability of the UE. The base station and the UE may support one or more modes mentioned above.

Figure 5:
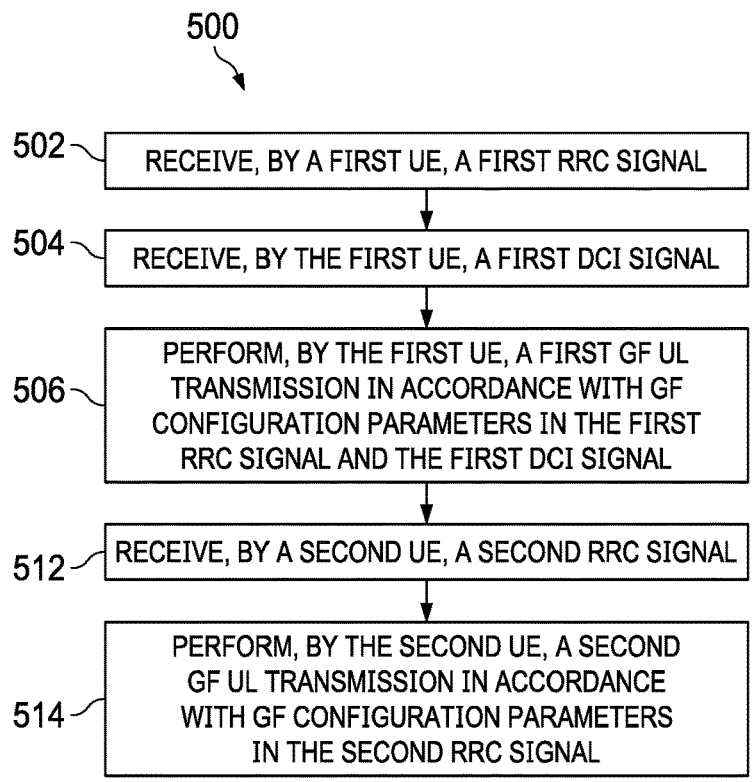
FIG. 5 is a flowchart of a method for two UEs to configure resources for transmission without grant.

FIG. 5 illustrates an exemplary flowchart of an embodiment method 500 for two UEs to configure resources for transmission without grant. Method 500 starts at step 502, where a first UE receives a first RRC signal from a base station. The first RRC signal may specify a first subset of configuration parameters for transmission without grant for the first UE. In one embodiment, the first subset of the configuration parameters specified by the first RRC signal may comprise resource periodicity for transmission without grant. The first UE may be UE1 in FIG. 2.

At step 504 of FIG. 5, the first UE receives a first DCI signal from the base station. The first DCI signal may specify a second subset of the configuration parameters for transmission without grant for the first UE. In one embodiment, the second subset of the configuration parameters specified by the first DCI signal may include one or more of UL time/frequency resources reserved for transmission without grant, a modulation and coding scheme (MCS) parameter for transmission without grant, and a demodulation reference signal (DMRS) configuration for transmission without grant.

At step 506, the first UE may perform a first transmission without grant in accordance with configuration parameters for transmission without grant in the first RRC signal and the first DCI signal. In one embodiment, the first UE may perform the first UL transmission without grant in accordance with the first subset of the configuration parameters for transmission without grant specified in the first RRC signal and the second subset of the configuration parameters for transmission without grant specified in the first DCI signal.

At step 512, a second UE receives a second RRC signal from the base station. The second RRC signal may specify one or more configuration parameters for transmission without grant. In one embodiment, the second RRC signal may include one or more of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. In the second RRC signal, the time resource size parameter for transmission without grant may include an accessible start position and an accessible end position of a data transmission interval (TTI). The data TTI may be one of a symbol, a mini-slot, and a slot. The terminology "mini-slot" can also be referred to as "non-slot." The TTI here is also applicable to transmitting any control information in uplink (UL) and/or downlink (DL). The second UE may be UE2 in FIG. 2.

In addition, the one or more second UE configuration parameters specified by the second RRC signal may include transmission numerology for transmission without grant, sub-band division, and sub-band locations. In one embodiment, the transmission numerology for transmission without grant, the sub-band division, and the sub-band locations are pre-configured by explicit or implicit broadcasting signaling. In another embodiment, the transmission numerology for transmission without grant, the sub-band division, and the sub-band locations may be pre-configured by RRC signaling.

In some embodiments, the one or more second UE configuration parameters of the second RRC signal may specify one or more bandwidth parts to be activated as one or more active bandwidth parts or to be defined as one or more default active bandwidth parts in a serving cell.

At step 514 of FIG. 5, the second UE may perform a second UL transmission without grant in accordance with configuration parameters for transmission without grant specified by the second RRC signal. In one embodiment, a DCI signaling is not required for resource configuration for the second UE. Thus, with the received second RRC, the second UE may perform the second UL transmission without grant without waiting for a DCI signal.

In some embodiments, at least one of the first and second RRC signals may comprise information indicating one of at least two pre-defined resource configuration options for UL transmission without grant. The first pre-defined resource configuration option may be a combination of RRC configuration and DCI/Layer 1 signaling. The first RRC signal received by the first UE may indicate that the first UE is receiving a combination of RRC configuration and DCI/Layer 1 signaling configuration. The second pre-defined transmission resource configuration option may be the non-DCI signaling (e.g., RRC signaling) based configuration. The second RRC signal received by the second UE may indicate that the second UE is receiving a non-DCI signaling based configuration.

For the non-DCI signaling based configuration, a UE may receive configuration parameters updates in an RRC signal or a DCI signal from the base station. For example, the second UE may receive a third RRC signal comprising information for updating the one or more configuration parameters for transmission without grant specified by the second RRC signal. In another example, the second UE may receive a second DCI signal specifying information for updating the one or more configuration parameters for transmission without grant specified by the second RRC signal. After receiving the updates, the second UE may perform a UL transmission without grant in accordance with the updated one or more configuration parameters for transmission without grant.

In one embodiment, a UE may use the configuration parameters for transmission without grant to perform data transmission without grant or control message transmission without grant. For example, the first UE may perform the first UL transmission without grant in accordance with the first and second subsets of configuration parameters for transmission without grant, and the first UL transmission without grant can be data transmission, control message transmission, or a combination of both. In another example, the first UE may perform the second UL transmission without grant in accordance with the one or more configuration parameters for transmission without grant specified by the second RRC signal, and the second UL transmission without grant can be data transmission, control message transmission, or a combination of both.

In one embodiment, when in an inactive or an idle state, the first UE may receive a broadcast signal specifying one or more configuration parameters for transmission without grant from the base station. The one or more configuration parameters for transmission without grant may include at least one of UL frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The first UE may then perform a UL transmission in accordance with the one or more configuration parameters for transmission without grant specified by the broadcast signal.

In another embodiment, when in an inactive or an idle state, the first UE may receive a multicast signal specifying one or more configuration parameters for transmission without grant from the base station. The one or more configuration parameters for transmission without grant may include at least one of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The first UE may then perform a UL transmission in accordance with the one or more configuration parameters for transmission without grant specified by the multicast signal.

In one embodiment, when in an inactive or an idle state, the second UE may receive a broadcast signal specifying one or more configuration parameters for transmission without grant from the base station. The one or more configuration parameters for transmission without grant may include at least one of UL frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The second UE may then perform a UL transmission in accordance with the one or more configuration parameters for transmission without grant specified by the broadcast signal.

In another embodiment, when in an inactive or an idle state, the second UE may receive a multicast signal specifying one or more configuration parameters for transmission without grant from the base station. The one or more configuration parameters for transmission without grant may include at least one of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. The second UE may then perform a UL transmission in accordance with the one or more configuration parameters for transmission without grant specified by the multicast signal.

Figure 6:
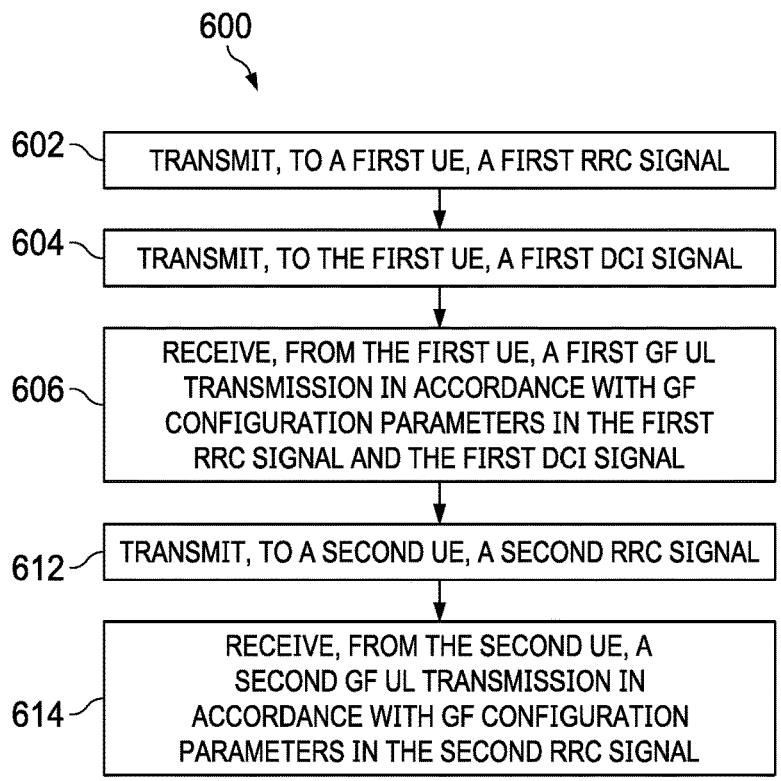
FIG. 6 is a flowchart of a method for a base station to configure resources for transmission without grant.

FIG. 6 illustrates an exemplary flowchart of an embodiment method 600 for a base station to configure transmission resources for transmission without grant. Method 600 starts at step 602, where the base station transmits a first Radio Resource Control (RRC) signal to a first UE. The first RRC signal may specify a first subset of first UE configuration parameters.

At step 604, the base station transmits a first DCI signal to the first UE. The first DCI signal may specify a second subset of first UE configuration parameters. In one embodiment, the first subset of the first UE configuration parameters for transmission without grant may comprise resource periodicity for transmission without grant. The second subset of the first UE configuration parameters for transmission without grant may comprise one or more of UL time/frequency resources reserved for transmission without grant, a modulation and coding scheme (MCS) parameter for transmission without grant, and a demodulation reference signal (DMRS) configuration for transmission without grant.

At step 606, the base station may receive, from the first UE, a first UL transmission without grant in accordance with configuration parameters for transmission without grant in the first RRC signal and the first DCI signal. In one embodiment, the base station may receive the first UL transmission without grant in accordance with the first subset of the configuration parameters for transmission without grant specified in the first RRC signal and the second subset of the configuration parameters for transmission without grant specified in the first DCI signal.

At step 612, the base station transmits a second RRC signal to a second UE. The second RRC signal may specify one or more second UE configuration parameters. In one embodiment, the second RRC signal may include one or more of uplink (UL) frequency resources reserved for transmission without grant, starting time reference, resource periodicity, a time resource size parameter for transmission without grant, a modulation and coding scheme (MCS) parameter for transmission without grant, a demodulation reference signal (DMRS) configuration for transmission without grant, power control parameters, and one or more repetition factors for transmission without grant. In the second RRC signal, the time resource size parameter for transmission without grant may include an accessible start position and an accessible end position of a data transmission interval (TTI). The data TTI may be one of a symbol, a mini-slot, and a slot. The terminology "mini-slot" can also be referred to as "non-slot." The TTI here is also applicable to transmitting any control information in uplink (UL) and/or downlink (DL).

At step 614, the base station may receive, from the second UE, a second UL transmission without grant in accordance with configuration parameters for transmission without grant in the second RRC signal. In one embodiment, DCI signaling is not required for resource configuration for the second UE. Thus, with the transmitted second RRC, the base station may receive, from the second UE, the second UL transmission without grant without waiting transmitting a DCI signal to the second UE.

In some embodiments, at least one of the first and second RRC signals may comprise information indicating one of at least two pre-defined resource configuration options for UL transmission without grant. The first transmission configuration option may be a combination of RRC configuration and DCI/Layer 1 signaling. The first RRC signal transmitted by the base station may indicate that the first UE is receiving a combination of RRC configuration and DCI/Layer 1 signaling configuration. The second UL transmission resource configuration option may be the non-DCI signaling (e.g., RRC signaling) based configuration. The second RRC signal transmitted by the base station may indicate that the second UE is receiving a non-DCI signaling based configuration.

For the non-DCI signaling based configuration, a base station may transmit configuration parameters updates in an RRC signal or a DCI signal to a UE. For example, the base station may transmit to the second UE a third RRC signal comprising information for updating the one or more configuration parameters for transmission without grant specified by the second RRC signal. In another example, the base station may transmit, to the second UE, a second DCI signal specifying information for updating the one or more configuration parameters for transmission without grant specified by the second RRC signal. After transmitting the updates, the base station may receive a UL transmission without grant in accordance with the updated one or more configuration parameters for transmission without grant.

Figure 7A:
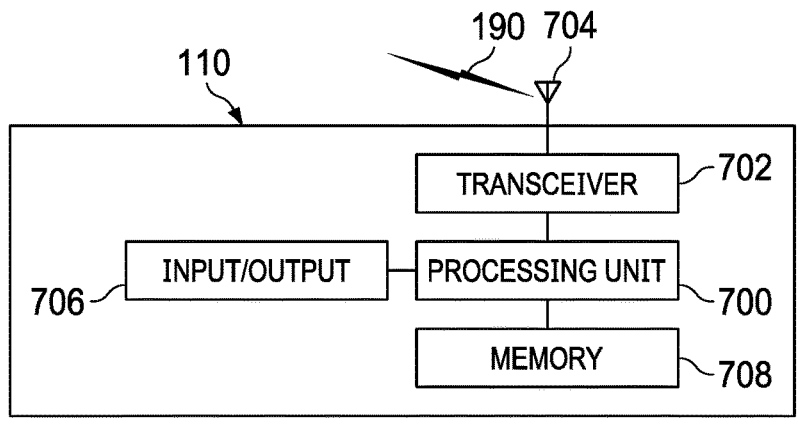
FIG. 7A is a block diagram of an exemplary wireless communication device.
Figure 7B:
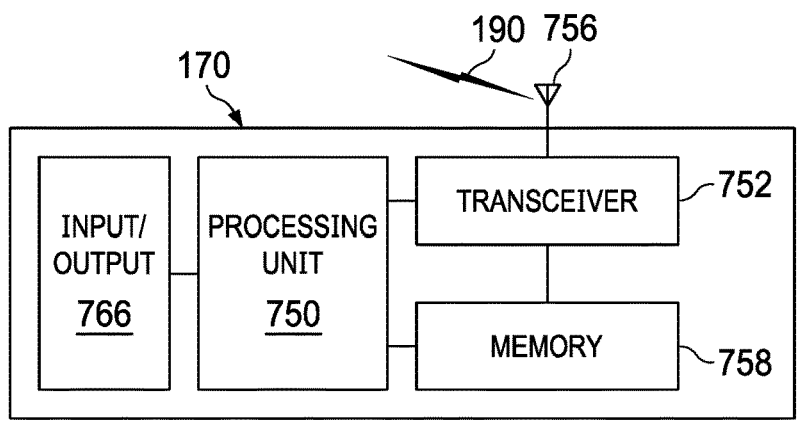
FIG. 7B is a block diagram of an exemplary base station.

FIGS. 7A and 7B illustrate example devices that may implement the methods and teachings according to this disclosure. In particular, FIG. 7A illustrates an example UE 110, and FIG. 7B illustrates an example base station 170. These components could be used in the system 100 or in any other suitable system.

As shown in FIG. 7A, the UE 110 includes at least one processing unit 700. The processing unit 700 implements various processing operations of the UE 110. For example, the processing unit 700 could perform signal coding, data processing, power control, input/output processing, or any other functionality enabling the UE 110 to operate in the system 100. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The UE 110 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission and/or processing signals received wirelessly or by wire. Each antenna 704 includes any suitable structure for transmitting and/or receiving wireless or wired signals. One or multiple transceivers 702 could be used in the UE 110, and one or multiple antennas 704 could be used in the UE 110. Although shown as a single functional unit, a transceiver 702 could also be implemented using at least one transmitter and at least one separate receiver.

The UE 110 further includes one or more input/output devices 706 or interfaces (such as a wired interface to the internet 150). The input/output devices 706 facilitate interaction with a user or other devices (network communications) in the network. Each input/output device 706 includes any suitable structure for providing information to or receiving/providing information from a user, such as a speaker, microphone, keypad, keyboard, display, or touch screen, including network interface communications.

In addition, the UE 110 includes at least one memory 708. The memory 708 stores instructions and data used, generated, or collected by the UE 110. For example, the memory 708 could store software or firmware instructions executed by the processing unit(s) 700 and data used to reduce or eliminate interference in incoming signals. Each memory 708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 170 includes at least one processing unit 750, at least one transceiver 752, which includes functionality for a transmitter and a receiver, one or more antennas 756, at least one memory 758, and one or more input/output devices or interfaces 766. A scheduler 753, which would be understood by one skilled in the art, is coupled to the processing unit 750. The scheduler 753 could be included within or operated separately from the base station 170. The processing unit 750 implements various processing operations of the base station 170, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more UEs or other devices. Each transceiver 752 further includes any suitable structure for processing signals received wirelessly or by wire from one or more UEs or other devices. Although shown combined as a transceiver 752, a transmitter and a receiver could be separate components. Each antenna 756 includes any suitable structure for transmitting and/or receiving wireless or wired signals. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile and/or non-volatile storage and retrieval device(s). Each input/output device 766 facilitates interaction with a user or other devices (network communications) in the network. Each input/output device 766 includes any suitable structure for providing information to or receiving/providing information from a user, including network interface communications.

Note that in both UEs like FIG. 7A or base stations like FIG. 7B, memory can be integrated into the processing unit when the processing unit is implemented by hardware, such as using integrated circuits or logic circuits.

Figure 8:
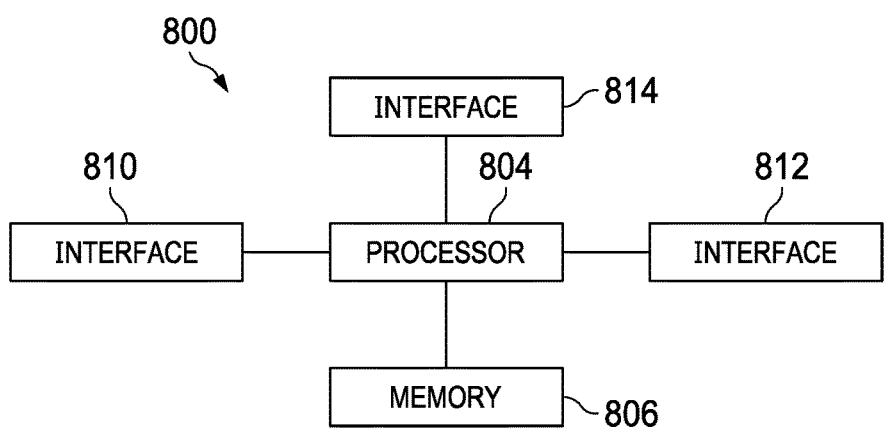
FIG. 8 is a block diagram of a processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 810, 812, 814 connects the processing system 800 to a transceiver adapted to transmit and receive signaling over the telecommunications network.

In a first aspect, a method of grant-free transmissions includes selecting, by a base station, a grant-free uplink transmission resource configuration option from at least two grant-free uplink transmission resource configuration options for a UE; and notifying the UE of the selected option. With this method, UE can have more flexibility to be allocated the grant-free resources.

In a first implementation form of the method of the first aspect, one of the at least two grant-free uplink transmission resource configuration options is a combination of RRC configuration and Layer 1 signaling resource configuration.

In a second implementation form of the method of the first aspect, predictable traffic, such as Voice over Internet Protocol (VoIP), can be configured with grant-free transmissions by a combination of dynamic Downlink Control Information (DCI) and non-DCI signaling based signaling.

In a third implementation form of the method of the first aspect, one of the at least two grant-free uplink transmission resource configuration options is the non-DCI signaling based configuration.

In a fourth implementation form of the method of the first aspect, the non-DCI signaling configuration is for a latency-sensitive service.

In a fifth implementation form of the method of the first aspect, the non-DCI signaling configuration is for a latency-insensitive service.

In a sixth implementation form of the method of the first aspect, the grant-free uplink transmission resource configuration option is pre-defined or broadcasted.

In a seventh implementation form of the method of the first aspect, the notifying the selected option to the UE is implicit by mapping non-DCI signaling information to the selected option.

In an eighth implementation form of the method of the first aspect, the mapping the non-DCI signaling information to the selected option is, if the non-DCI signaling information includes enough resource information required for grant-free transmission, the selected option is non-DCI signaling based configuration; otherwise the selected option is a combination of RRC configuration and DCI/Layer 1 signaling resource configuration.

In a ninth implementation form of the method of the first aspect, wherein the notifying the selected option to the UE is implicit if the selected option is same as a default option.

In a tenth implementation form of the method of the first aspect, wherein the non-DCI signaling includes radio resource control signaling, broadcast signaling, or multicast signaling.

In a second aspect, a base station for grant-free transmissions to implement the method in the first aspect is provided.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method comprising:
receiving, by a first apparatus from a base station, a first Radio Resource Control (RRC) signal specifying a first subset of first user equipment (UE) configuration parameters for first grant-free (GF) transmissions, and a first downlink control information (DCI) signal specifying a second subset of the first UE configuration parameters;
after the receiving the first DCI signal, performing, by the first apparatus to the base station, a first uplink (UL) GF transmission of the first GF transmissions in accordance with the first subset of the first UE configuration parameters in the first RRC signal and the second subset of the first UE configuration parameters in the first DCI signal;
receiving, by a second apparatus from the base station, a second RRC signal specifying one or more second UE configuration parameters for second GF transmissions; and
performing, by the second apparatus to the base station, a second UL GF transmission of the second GF transmissions in accordance with the one or more second UE configuration parameters in the second RRC signal without DCI signaling for resource configuration,
wherein the first RRC signal comprises first resource periodicity for the first GF transmissions, and the first resource periodicity indicates a number of time units between two periodic neighboring UL GF data transmission occasions for the first GF transmissions using a first GF resource, and
wherein the second RRC signal comprises second resource periodicity for the second GF transmissions, and the second resource periodicity indicates a number of time units between two periodic neighboring UL GF data transmission occasions for the second GF transmissions using a second GF resource.

2. The method of claim 1, wherein the second subset of the first UE configuration parameters for the first GF transmissions specified by the first DCI signal comprises at least one of: UL time/frequency resources reserved for the first GF transmissions, a modulation and coding scheme (MCS)

parameter for the first GF transmissions, and a demodulation reference signal (DMRS) configuration for the first GF transmissions.

3. The method of claim 1, wherein the one or more second UE configuration parameters specified by the second RRC signal further include at least one of: UL frequency resources reserved for the second GF transmissions, starting time reference, a time resource size parameter for the second GF transmissions, a modulation and coding scheme (MCS) parameter for the second GF transmissions, a demodulation reference signal (DMRS) configuration for the second GF transmissions, power control parameters, and one or more repetition factors for the second GF transmissions.

4. The method of claim 3, wherein, in the one or more second UE configuration parameters specified by the second RRC signal, the time resource size parameter for the second GF transmissions includes an accessible start position and an accessible end position of a data transmission time interval (TTI), and wherein the data TTI is one of a symbol, a mini-slot, and a slot.

5. The method of claim 1, wherein the first UL GF transmission, performed by the first apparatus in accordance with the first and second subsets of the first UE configuration parameters for the first GF transmissions, comprises at least one of data transmission and control message transmission.

6. The method of claim 1, wherein the second UL GF transmission, performed by the second apparatus in accordance with the one or more second UE configuration parameters for the second GF transmissions specified by the second RRC signal, comprises at least one of data transmission and control message transmission.

7. The method of claim 1, wherein the first RRC signal comprises information indicating first at least two pre-defined UL resource configuration options for the first GF transmissions, and wherein the second RRC signal comprises information indicating second at least two pre-defined UL resource configuration options for the second GF transmissions.

8. The method of claim 1, further comprising:
receiving, by the second apparatus, a third RRC signal comprising information for updating the one or more second UE configuration parameters for the second GF transmissions specified by the second RRC signal; and
performing, by the second apparatus, a UL GF transmission in accordance with the updated one or more second UE configuration parameters for the second GF transmissions.

9. The method of claim 1, further comprising:
receiving, by the second apparatus, a second DCI signal specifying information for updating the one or more second UE configuration parameters for the second GF transmissions specified by the second RRC signal; and
performing, by the second apparatus, a UL GF transmission in accordance with the updated one or more second UE configuration parameters for the second GF transmissions.

10. The method of claim 1, wherein the second RRC signal comprises information including transmission numerology, sub-band division, and sub-band locations, and the transmission numerology comprises at least one of a sub-carrier spacing, a cyclic prefix (CP) length, or a CP type.

11. The method of claim 10, wherein at least one of the transmission numerology, the sub-band division, or the sub-band locations is pre-configured or configured by explicit or implicit broadcasting signaling.

12. The method of claim 1, wherein the one or more second UE configuration parameters specified by the second RRC signal specify one or more bandwidth parts to be activated as one or more active bandwidth parts or to be defined as one or more default active bandwidth parts in a serving cell.

13. The method of claim 1, further comprising:
receiving, by the first apparatus in an inactive or an idle state, a broadcast signal specifying one or more configuration parameters for the first GF transmissions, the one or more configuration parameters for the first GF transmissions including at least one of UL frequency resources reserved for the first GF transmissions, starting time reference, the first resource periodicity, a time resource size parameter for the first GF transmissions, a modulation and coding scheme (MCS) parameter for the first GF transmissions, a demodulation reference signal (DMRS) configuration for the first GF transmissions, power control parameters, and one or more repetition factors for the first GF transmissions; and
performing, by the first apparatus, a UL GF transmission in accordance with the one or more configuration parameters for the first GF transmissions specified by the broadcast signal.

14. The method of claim 1, further comprising:
receiving, by the first apparatus in an inactive or an idle state, a multicast signal specifying one or more configuration parameters for the first GF transmissions, the one or more configuration parameters for the first GF transmissions including at least one of UL frequency resources reserved for the first GF transmissions, starting time reference, the first resource periodicity, a time resource size parameter for the first GF transmissions, a modulation and coding scheme (MCS) parameter for the first GF transmissions, a demodulation reference signal (DMRS) configuration for the first GF transmissions, power control parameters, and one or more repetition factors for the first GF transmissions; and
performing, by the first apparatus, a UL GF transmission in accordance with the one or more configuration parameters for the first GF transmissions specified by the multicast signal.

15. The method of claim 1, further comprising:
receiving, by the second apparatus in an inactive or idle state, a broadcast signal specifying one or more configuration parameters for the second GF transmissions, the one or more configuration parameters for the second GF transmissions including at least one of UL frequency resources reserved for the second GF transmissions, starting time reference, the second resource periodicity, a time resource size parameter for the second GF transmissions, a modulation and coding scheme (MCS) parameter for the second GF transmissions, a demodulation reference signal (DMRS) configuration for the second GF transmissions, power control parameters, and one or more repetition factors for the second GF transmissions; and
performing, by the second apparatus, a UL GF transmission in accordance with the one or more configuration parameters for the second GF transmissions, wherein the one or more configuration parameters are specified by the broadcast signal.

16. The method of claim 1, further comprising:
receiving, by the second apparatus in an inactive or idle state, a multicast signal specifying one or more configuration parameters for the second GF transmissions, the one or more configuration parameters for the second GF transmissions including at least one of UL frequency resources reserved for the second GF transmissions, starting time reference, the second resource periodicity, a time resource size parameter for the second GF transmissions, a modulation and coding scheme (MCS) parameter for the second GF transmissions, a demodulation reference signal (DMRS) configuration for the second GF transmissions, power control parameters, and one or more repetition factors the second GF transmissions; and performing, by the second apparatus, a UL GF transmission in accordance with the one or more configuration parameters for the second GF transmissions specified by the multicast signal.

17. A method comprising:

transmitting, by a base station to a first user equipment (UE), a first Radio Resource Control (RRC) signal specifying a first subset of first UE configuration parameters for first grant-free (GF) transmissions, and a first downlink control information (DCI) signal specifying a second subset of first UE configuration parameters;

after the transmitting the first DCI signal, receiving, by the base station from the first UE, a first uplink (UL) GF transmission of the first GF transmissions in accordance with the first subset of the first UE configuration parameters in the first RRC signal and the second subset of the first UE configuration parameters in the first DCI signal;

transmitting, by the base station to a second UE, a second RRC signal specifying one or more second UE configuration parameters for second GF transmissions; and receiving, by the base station from the second UE, a second UL GF transmission of the second GF transmissions in accordance with the one or more second UE configuration parameters in the second RRC signal without DCI signaling for resource configuration, wherein the first RRC signal comprises first resource periodicity for the first GF transmissions, and the first resource periodicity indicates a number of time units between two periodic neighboring UL GF data transmission occasions for the first GF transmissions using a first GF resource, or wherein the second RRC signal comprises second resource periodicity for the second GF transmissions, and the second resource periodicity indicates a number of time units between two periodic neighboring UL GF data transmission occasions for the second GF transmissions using a second GF resource.

18. The method of claim 17, wherein the second subset of the first UE configuration parameters for the first GF transmissions comprises at least one of: UL time/frequency resources reserved for the first GF transmissions, a modulation and coding scheme (MCS) parameter for the first GF transmissions, and a demodulation reference signal (DMRS) configuration for the first GF transmissions.

19. The method of claim 17, wherein at least one of the first and second RRC signals comprises information indicating one of at least two pre-defined resource configuration options for UL GF transmission.

20. The method of claim 17, wherein the one or more second UE configuration parameters for the second GF transmissions in the second RRC signal include at least one of UL frequency resources reserved for the second GF transmissions, starting time reference, the second resource periodicity, a time resource size parameter for the second GF transmissions, a modulation and coding scheme (MCS) parameter for the second GF transmissions, a demodulation reference signal (DMRS) configuration for the second GF transmissions, power control parameters, and one or more repetition factors for the second GF transmissions.

21. The method of claim 20, wherein in the second RRC signal, the time resource size parameter for the second GF transmissions includes an accessible start position and an accessible end position of a data transmission time interval (TTI), and wherein the data TTI is one of a symbol, a mini-slot, and a slot.

22. A base station comprising:

a non-transitory memory storage comprising instructions; and one or more processors in communication with the non-transitory memory storage, wherein the one or more processors execute the instructions to cause the base station to:

transmit, to a first user equipment (UE), a first Radio Resource Control (RRC) signal specifying a first subset of first UE configuration parameters for first grant-free (GF) transmissions, and a first downlink control information (DCI) signal specifying a second subset of first UE configuration parameters;

after the first DCI signal is received, receive, from the first UE, a first uplink (UL) GF transmission of the first GF transmissions in accordance with the first subset of the first UE configuration parameters in the first RRC signal and the second subset of the first UE configuration parameters in the first DCI signal;

transmit, to a second UE, a second RRC signal specifying one or more second UE configuration parameters for second GF transmissions; and receive, from the second UE, a second UL GF transmission of the second GF transmissions in accordance with the one or more second UE configuration parameters in the second RRC signal without DCI signaling for resource configuration, wherein the first RRC signal comprises first resource periodicity for the first GF transmissions, and the first resource periodicity indicates a number of time units between two periodic neighboring UL GF data transmission occasions for the first GF transmissions using a first GF resource, and wherein the second RRC signal comprises second resource periodicity for the second GF transmissions, and the second resource periodicity indicates a number of time units between two periodic neighboring UL GF data transmission occasions for the second GF transmissions using a second GF resource.

23. The method of claim 1, further comprising:

performing, by the second apparatus to the base station, a third UL GF transmission in accordance with the one or more second UE configuration parameters in the second RRC signal without DCI signaling for resource configuration.

24. The method of claim 17, further comprising:

receiving, by the base station from the second UE, a third UL GF transmission in accordance with the one or more second UE configuration parameters in the second RRC signal without DCI signaling for resource configuration.

25. The method of claim 1, further comprising:

receiving, by the first apparatus, a third RRC signal specifying reconfiguration of the first UE configuration parameters.

26. The method of claim 1, wherein the first RRC signal and the second RRC signal are UE-specific, the method further comprising:

before the receiving, transmitting, by at least one of the first apparatus or the second apparatus to the base station, GF capability information.

27. The method of claim 1, wherein the number of time units indicated by the first resource periodicity is a number of slots or a number of symbols.

\* \* \* \* \*